US011378802B2

(12) United States Patent
Moon

(10) Patent No.: US 11,378,802 B2
(45) Date of Patent: Jul. 5, 2022

(54) SMART EYEGLASSES

(71) Applicant: MTIS CORPORATION, Seoul (KR)

(72) Inventor: Myung-Il Moon, Incheon (KR)

(73) Assignee: MTIS CORPORATION, Seoul (KR)

( * ) Notice: Subject to any disclaimer, the term of this patent is extended or adjusted under 35 U.S.C. 154(b) by 599 days.

(21) Appl. No.: 16/339,373

(22) PCT Filed: Sep. 29, 2017

(86) PCT No.: PCT/KR2017/011065
§ 371 (c)(1),
(2) Date: Apr. 4, 2019

(87) PCT Pub. No.: WO2018/066962
PCT Pub. Date: Apr. 12, 2018

(65) Prior Publication Data
US 2021/0373333 A1   Dec. 2, 2021

(51) Int. Cl.
*G02B 27/01* (2006.01)
*G02B 27/00* (2006.01)
*G02C 7/08* (2006.01)

(52) U.S. Cl.
CPC ..... *G02B 27/0172* (2013.01); *G02B 27/0093* (2013.01); *G02C 7/08* (2013.01);
(Continued)

(58) Field of Classification Search
CPC ............ G02B 27/0172; G02B 27/0093; G02B 2027/0178; G02B 2027/014; G02B 2027/0138; G02C 7/08
See application file for complete search history.

(56) References Cited

U.S. PATENT DOCUMENTS 5,515,122 A * 5/1996 Morishima ............ G09B 9/307
                                                         353/28
2002/0085843 A1* 7/2002 Mann .................... E03C 1/057
                                                         396/374
(Continued)

FOREIGN PATENT DOCUMENTS

EP    2814252 A2 * 12/2014 ........... H04N 13/344
JP    2000-333211 A    11/2000
(Continued)

OTHER PUBLICATIONS

Machine Translation of TW-200409944-A (Year: 2004).*
International Search Report for PCT/KR2017/011065 dated Jan. 18, 2018 from Korean Intellectual Property Office.

*Primary Examiner* — Darryl J Collins
*Assistant Examiner* — Matthew Y Lee
(74) *Attorney, Agent, or Firm* — Revolution IP, PLLC

(57) ABSTRACT

A smart glasses include: a main frame having an eyeglass frame shape; a support frame coupled to a central portion of the main frame; a first display supported by the support frame and displaying a first image; a second display supported by the support frame and displaying a second image; a first mirror for reflecting the first image; a second mirror for reflecting the second image; a first main lens for providing a first main image from the central portion of the main frame to the inside thereof on the basis of the first image reflected by the first mirror; and a second main lens for providing a second main image from the central portion of the main frame to the inside thereof on the basis of the second image reflected by the second mirror.

11 Claims, 17 Drawing Sheets

(52) U.S. Cl.
CPC .............. *G02B 2027/014* (2013.01); *G02B 2027/0138* (2013.01); *G02B 2027/0178* (2013.01)

(56) References Cited

U.S. PATENT DOCUMENTS

| | | |
|---|---|---|
| 2009/0027772 A1 | 1/2009 | Robinson |
| 2015/0226971 A1 | 8/2015 | Kim et al. |
| 2018/0008141 A1* | 1/2018 | Krueger .................. A61B 5/11 |
| 2018/0031848 A1* | 2/2018 | Huang ............... G02B 27/0179 |
| 2019/0019308 A1* | 1/2019 | Iwata ........................ G06T 7/80 |

FOREIGN PATENT DOCUMENTS

| | | | |
|---|---|---|---|
| KR | 10-2015-0062222 A | 6/2015 | |
| KR | 10-2015-0095342 A | 8/2015 | |
| KR | 10-2015-0123969 A | 11/2015 | |
| KR | 10-2016-0109021 A | 9/2016 | |
| TW | 200409944 A * | 6/2004 | ............. G02B 27/01 |

* cited by examiner

SMART EYEGLASSES

TECHNICAL FIELD

An embodiment of the present invention relates to smart glasses, and more specifically to smart glasses including a display device.

BACKGROUND ART

Generally, a Head Mount Display (HMD) refers to a digital device which displays a virtual image at a position close to the eyeball while wearing the HMD on the head like a pair of glasses. Recently, the HMD has developed as a technology that combines with an augmented reality technology and the like beyond simple display functions. For example, the HMD not only provides various conveniences to a user through a screen in front of the user's eyes and performs communication with an external digital device to output a corresponding content, but also receives a user input for an external digital device or performs an operation in conjunction with the corresponding external digital device.

An augmented reality refers to a hybrid virtual reality which is obtained by merging a reality and a virtual environment on the basis of a technique of superimposing a three-dimensional virtual object on the real world and displaying the same. The hybrid virtual reality is used in various fields, such as military, entertainment, medical, learning, movie, architectural design, and tourism, and is gradually applied to real life beyond an imaginal phase described in science-fiction novels and movies.

Virtual reality systems include Window Systems, mirror systems, vehicle-based systems, augmented reality systems, and the like. These systems are basically divided into output devices and input devices. The output devices are devices allowing users of a virtual reality system to perceive vision, hearing, tactile, and movement through a sensory channel. The output devices include a visual display device, an auditory display device, a tactile display device, and a movement feedback and display device. Representative hardware of the visual display device is an HMD and smart glasses.

The goal of virtual reality is to allow a user to experience telepresence. Originally, a sense of presence refers to the feeling of being there (sense of being) in a certain environment. In this sense, the telepresence allows a user to experience the user's presence in a certain environment by means of a communication medium.

However, since the conventional smart glasses reproduce an image through one eyeball of one eye among the left eye and the right eye of a user and the user views a multimedia content through only one eyeball, there is a problem of rapidly increasing various side effects such as dizziness and fatigue even when the user views the multimedia content only for a predetermined time.

DETAILED DESCRIPTION OF THE INVENTION

Technical Problem

Accordingly, the present invention has been devised to solve the above-mentioned problem. An objective of the present invention is to provide smart glasses enabling observation of the same content through both eyes by reflecting a multimedia content provided by one display unit in both directions and reflecting a content enlarged by means of a magnifying lens unit into eyeballs of both eyes and enabling selective implementation of an augmented reality and a virtual reality by using a 3D content as necessary.

Another objective of the present invention is to provide smart glasses enabling a user's both eyeballs to simultaneously view a multimedia content implemented in a display unit or enabling the user to interact with the multimedia content.

Still another objective of the present invention is to provide smart glasses enabling implementation of an augmented reality and a virtual reality together in a head-up display device.

Technical Solution

In order to solve the above-described technical problem, an aspect of the present invention provides smart glasses including: a main frame having an eyeglass frame shape; a support frame coupled to a central portion of the main frame; a first display supported by the support frame and displaying a first image; a second display supported by the support frame and displaying a second image; a first mirror for reflecting the first image; a second mirror for reflecting the second image; a first main lens for providing a first main image from the central portion of the main frame to the inside thereof on the basis of the first image reflected by the first mirror; and a second main lens for providing a second main image from the central portion of the main frame to the inside thereof on the basis of the second image reflected by the second mirror.

In an embodiment, the smart glasses may further include: a first auxiliary lens disposed between the first mirror and the first main lens; and a second auxiliary lens disposed between the second mirror and the second main lens. The first auxiliary lens and the second auxiliary lens enlarge the first image and the second image, respectively.

In an embodiment, the first or second auxiliary lens may include a plurality of aspheric lenses.

In an embodiment, first main lens and the second main lens are formed of a plate-shaped reflective and transmissive member, and are arranged to be inclined at a predetermined angle with respect to the central axis of each of the first and second auxiliary lenses.

In an embodiment, the first main lens or the second main lens has a thickness of several millimeters or less.

In an embodiment, the smart glasses may further include a communication and power board received in a left or right frame portion of the main frame and connected to one or more of the first and second displays. The communication and power board is connected to an external control and power source device by wires and transfers signal and data communication between the control and power source device and the first and second displays.

In an embodiment, both an application processor and a battery included in the control and power source device are disposed outside the smart glasses.

In an embodiment, the first display and the second display each have a built-in display interface for control.

In an embodiment, the smart glasses further include a front camera installed on an outer surface of the central portion of the main frame and capturing an image of the front side, and connected to the control and power source device through the communication and power board.

In an embodiment, the front camera includes a first front camera and a second front camera separated from each other by a predetermined distance.

In an embodiment, the smart glasses include a rear camera or a sensor installed on the inner surface of the central portion of the main frame and capture an image of the rear side, and connected to the control and power source device through the communication and power board.

In an embodiment, the rear camera or sensor detects the user's eyelids.

In an embodiment, the smart glasses further include an actuator or a driver which is received in at least one of a left frame portion and a right frame portion of the main frame and operates in response to signals from the rear camera, the sensor, or the control and power source device.

In an embodiment, the smart glasses further include a speaker which is received in at least one of a left frame portion and a right frame portion of the mainframe and outputs an alarm in response to signals from the rear camera, the sensor, or the control and power source device.

In an embodiment, the control and power source device includes a control device and a power source device, wherein at least one of the control device and the power source device is supported by the main frame or mounted on an external device, and is connected to the communication and power board through a data and power source line mounted on the external device.

In order to solve the above-described technical problem, another aspect of the present invention provides smart glasses including: a main frame having an eyeglass frame shape; a support frame coupled to a central portion of the main frame; a first display supported by the support frame and outputting a first image in a first direction; a first mirror for reflecting the first image in a 2a direction orthogonal to the first direction; a first main lens for reflecting a first image, reflected by the first mirror, toward a user's eyes; a first convex lens installed between the first display and the first main lens so as to adjust a focal distance of a virtual image of the first image viewed through the first main lens; a second display supported by the support frame and outputting a second image in a first direction; a second mirror for reflecting the second image in a 2b direction orthogonal to the first direction and opposite to the 2a direction; a second main lens for reflecting a second image reflected by the second mirror towards a user's eyes; and a second convex lens installed between the second display and the second main lens so as to adjust a focal distance of a virtual image of the second image viewed through the second main lens.

In an embodiment, the first convex lens may be disposed between the first display and the first mirror, and the second convex lens may be disposed between the second display and the second mirror.

In an embodiment, the first convex lens may be disposed between the first mirror and the first main lens, and the first convex lens may be disposed between the second mirror and the second main lens.

In an embodiment, the first mirror and the second mirror may be a concave surface mirror.

In an embodiment, the first main lens and the second main lens are formed of a plate-shaped reflective and transmissive member, and are arranged to be inclined at a predetermined angle with respect to the central axis of each of the first and second auxiliary lenses.

In order to solve the above-described technical problem, still another aspect of the present invention provides smart glasses including: a main frame having a shape of hooking around a user's one ear and a length extending from the one ear to the front of the user's one eye adjacent to the one ear; a support frame coupled to a front surface portion of the main frame corresponding to the front of the one eye; a display supported by the support frame and outputting an image in a first direction; a mirror for reflecting the image in a second direction orthogonal to the first direction; a main lens for reflecting an image reflected by the mirror to the user's eyes; and a convex lens installed between the display and the main lens to adjust a focal distance of a virtual image of the image viewed through the main lens.

In an embodiment, the convex lens is disposed between the display and the mirror or disposed between the mirror and the main lens.

Advantageous Effects

The present invention allows one or two display units disposed at the center of the front side of smart glasses to provide an independent image to both eyes, so that a side viewing angle can be ensured.

Further, the present invention can effectively implement 2D and 3D images by means of a pair of smart glasses, and can implement an augmented reality and a virtual reality.

In addition, the present has an advantage in that the same multimedia content is provided to a user's both eyeballs by means of one or two displays, so that the user does not feel inconvenience even when the user has used the smart glasses for a long time.

In addition, the thickness of front main lenses can be reduced to lighten a device and the usability can be improved.

In addition, a user's eyelids are recognized through a rear camera or a sensor, and vibrations or alarms are generated according to a result of recognition through an actuator, a driver, or a speaker received in a device, so that the user and more particularly a drowsy driver can be warned about the risk of driving while drowsy.

In addition, the present invention can effectively discharge heat that may be generated while using a device for a long time to a heat sink or a heat dissipation structure disposed at the upper end of the front side of the main frame, thereby providing operation stability and reliability of smart glasses.

In addition, when a battery is removed from the smart glasses and power is supplied to the smart glasses through a battery of an external control and power source device, the smart glasses can be effectively lightened, and the comfortable of smart glasses and the convenience of use can be enhanced.

MODE FOR CARRYING OUT THE INVENTION

Hereinafter, with reference to the accompanying drawings, configurations and operations of an embodiment according to the present invention will be described in detail.

Figure 1:
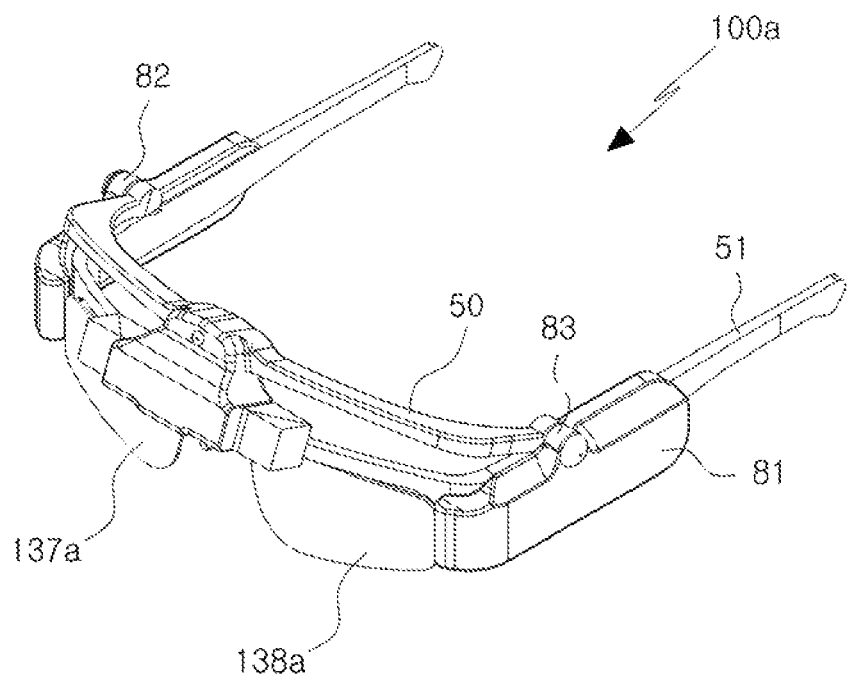
FIG. 1 is a perspective view of smart glasses according to an embodiment of the present invention.
Figure 2:
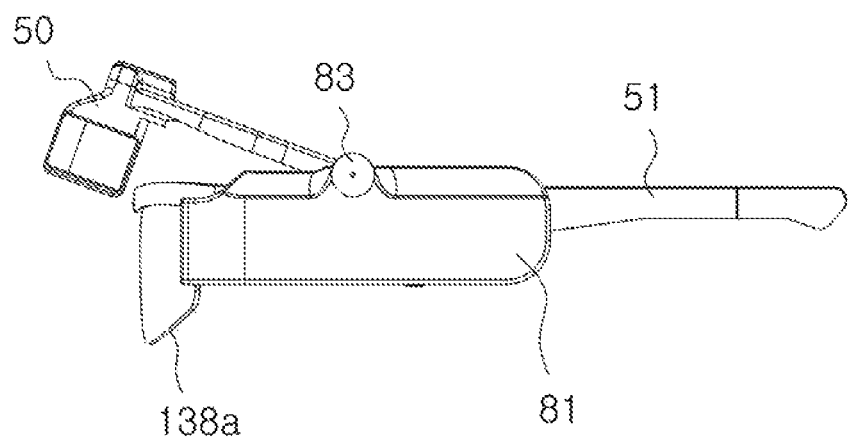
FIG. 2 is a side view of the smart glasses of FIG. 1.
Figure 3:
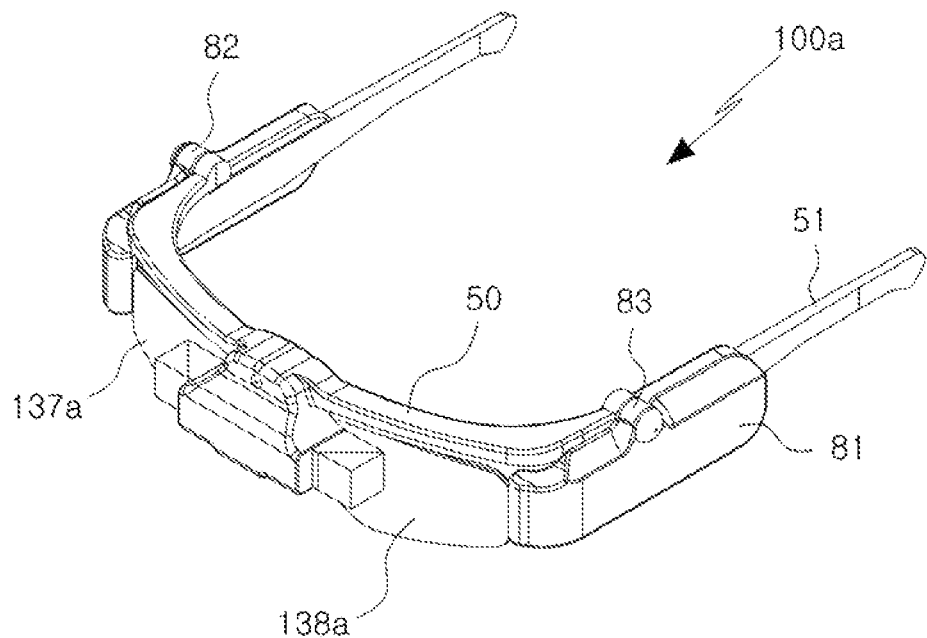
FIG. 3 is a perspective view showing an operation state of the smart glasses of FIG. 1.
Figure 4:
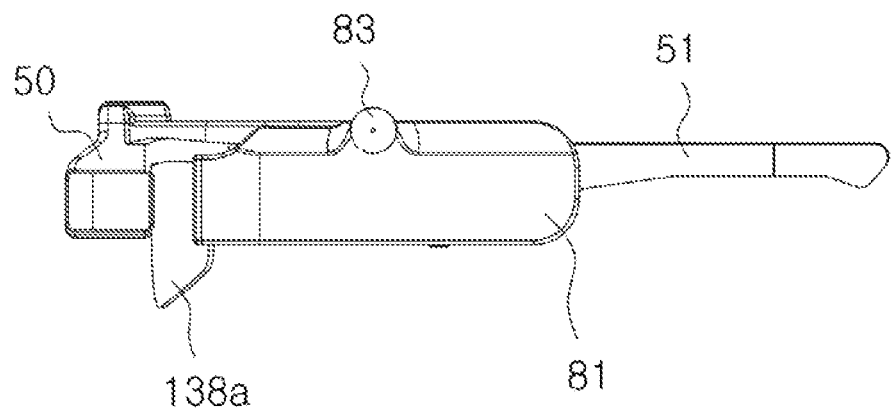
FIG. 4 is a side view of the smart glasses of FIG. 3.
Figure 5:
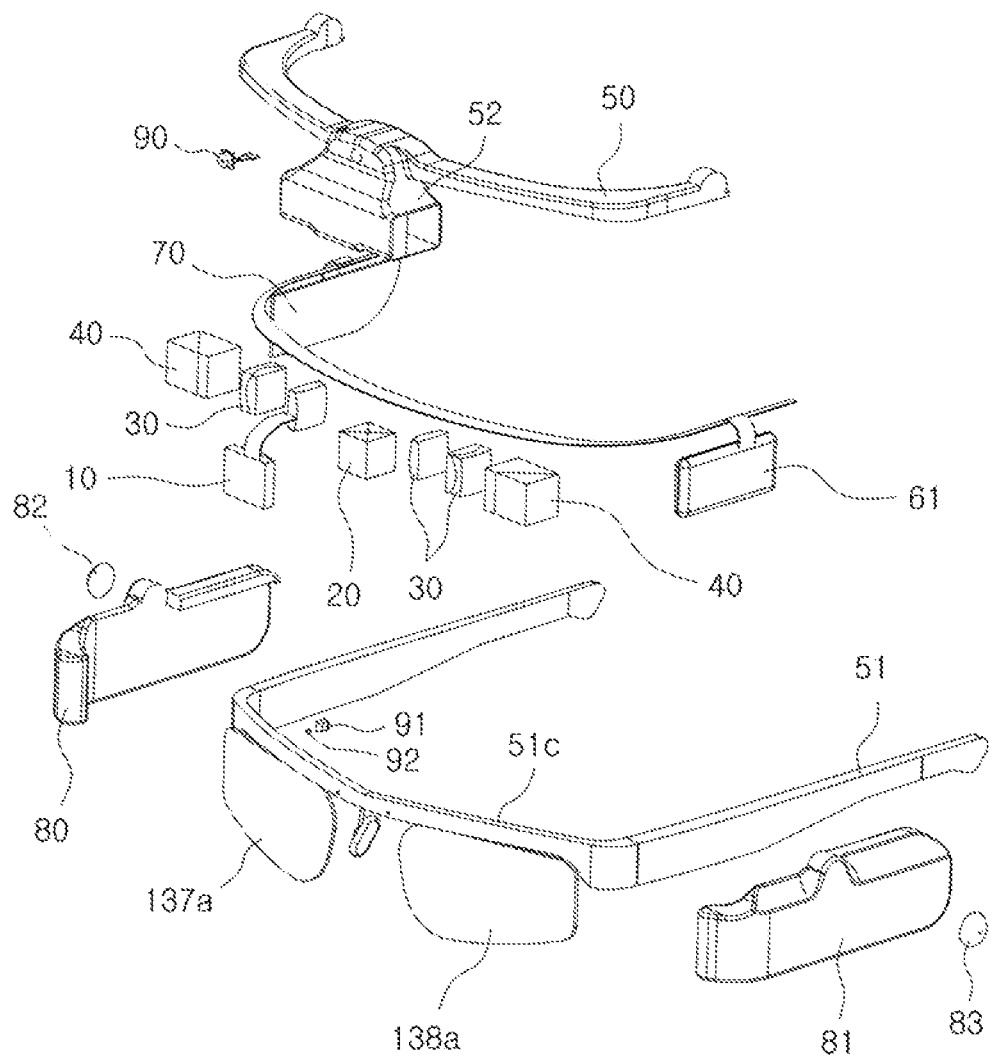
FIG. 5 is an exploded perspective view of the smart glasses of FIG. 1.

FIG. 1 is a perspective view of smart glasses according to an embodiment of the present invention. FIG. 2 is a side view of the smart glasses of FIG. 1. FIG. 3 is a perspective view showing an operation state of the smart glasses of FIG. 1. FIG. 4 is a side view of the smart glasses of FIG. 3. FIG. 5 is an exploded perspective view of the smart glasses of FIG. 1.

Referring to FIGS. 1 and 2, smart glasses 100 according to the present embodiment include a first frame 50 and a second frame 51, and the smart glasses 100 have a structure in which the first frame 50 is hinged to the second frame 51 by using a first hinge portion 82 and a second hinge portion 83.

When a user intends to use the smart glasses only as a pair of eye glasses during daily life, the user may use the smart glasses in a state where the first frames 50 is located above spectacle lenses 137a and 137b. The first frame 50 may include a display device, a mirror, a lens, and the like, and reflect and magnify an image of the display device and transfer the same to the user's eyes.

When the user wants to implement an augmented reality or a virtual reality by using a content transmitted from an external digital device, as shown in FIGS. 3 and 4, the user may operate the first frame 50 to rotate from above the spectacle lenses 137a and 138a to the downward so that a predetermined portion of the first frame 50 is located at the front of the spectacle lenses 137a and 138a, thereby using the content of the smart glasses.

In addition, a multimedia content transmitted from the external digital device may be directly output from the display unit 10 or output after being combined or converted. The display unit 10 may be configured by selecting one of display devices, such as a thin film transistor liquid crystal display (TFT LCD), an organic light emitting diode (OLED), a liquid crystal on silicon (LCoS), a digital light processing (DLP) according to a user's need or request.

In addition, a content implemented in the display unit 10 is reflected in both directions by a reflection unit 20. In order to reflect a content in both directions, the reflection unit 20 may be configured by an X-Prism. The reflective surface of the reflection unit 20 on which the content is reflected may be provided with a half mirror coating allowing reflection and transmission to be simultaneously performed. The reflection unit 20 is not limited to the X-prism but may be an optical element, such as a beam splitter, a half mirror, or a combination thereof that can simultaneously perform reflection and transmission.

The content reflected by the reflection unit 20 passes through the magnifying lens unit 30 and is enlarged. The magnifying lens unit 30 may include a plurality of aspheric lenses in order to enlarge the content and eliminate spherical aberration and the like at the same time. In the present embodiment, three aspheric lenses are used to enlarge the content and eliminate the spherical aberration. In view of a light path starting from a display device, the three aspheric lenses may include a one-sided convex lens, two-sided convex lenses, and a combination of optical elements in the form of a one-sided convex lens. A design technology using aspheric lenses in order to enlarge a content and eliminate spherical aberration is already well known, and thus is not specifically described herein.

A content enlarged while passing through the magnifying lens unit 30 is reflected by a reflection and transmissive unit 40 into both eyeball directions. The reflection and transmissive unit 40 not only reflects the enlarged content into the eyeball directions, but also is installed to enable observation of a content for implementing the virtual reality and the augmented reality through the reflection and transmissive unit, so that a half mirror coating allowing reflection and transmission to be simultaneously performed can be applied to the reflective surface.

In the present embodiment, a transparent prism is used as the reflection and transmissive unit 40, but it is not limited to a transparent prism, but an optical element allowing reflection and transmission to be simultaneously performed, such as a beam splitter or a half mirror, can be used.

The above-mentioned elements and combining relationships therebetween will be described in more detail as follows.

A display unit 10, a reflection unit 20, a magnifying lens unit 30, and a reflection and transmissive unit 40 are seated in a first frame 50. Specifically, the display unit 10, the reflection unit 20, the magnifying lens unit 30, and the reflection and transmissive unit 40 are seated in a front case 52 included in the first frame 50.

The display unit 10 receives a multimedia content from a main Printed Circuit Board (PCB) 70 through a Flexible Printed Circuit Board (FPCB) 60. A battery 61 is connected to the FPCB 60 to supply necessary power to the display unit and the like. The FPCB 60 is connected such that a multimedia content is transmitted from the main PCB 70 to the display unit 10, and is connected to the battery 61 so as to supply power to smart glasses 100a.

In addition, a wireless communication module (not shown) and a control unit (not shown) may be mounted on the main PCB 70. In the present embodiment, the wireless communication module receives a multimedia content from an external digital device, and the control unit may control driving of the main PCB 70, the display unit 10, and the like.

The first frame 50 is hinged to a first side case 80 and a second side case 81, which are coupled to the second frame 51, through a first hinge portion 82 and a second hinge portion 83, respectively. The first frame 50 may rotate between the upward and downward directions of the spectacle lenses 137a and 138a (or the front of the spectacle lens) through the first and second hinge portions. In addition, the main PCB 70 and the battery 61 may be seated on the inside of the first side case 80 and the second side case 81, respectively.

In addition, the first frame 50 may further include a camera unit 90. The second frame 51 may further include an indicator 92, such as a power on/off button 91 and a light emitting diode (LED).

The operation principle of smart glasses of the present embodiment will be described as follows.

When a user intends to implement an augmented reality or a virtual reality using the smart glasses, the user may operate the first frame 50 of the smart glasses, which is located above the spectacle lenses 137a and 138a, to rotate downward so that the first frame 50 is located at the front of the spectacle lenses 137a and 138a. In addition, a control unit of the main PCB 70 may receive a multimedia content from an external digital device through a wireless communication module and transmit the received multimedia content to the display unit 10.

When an image content is output from the display unit 10, the image content is reflected in both directions by the reflection unit 20 and then transmitted to the magnifying lens unit 30. The reflection unit 20 may include an X-Prism for transmitting one content to both directions. The content enlarged while passing through the magnifying lens unit 30 is reflected by the reflection and transmissive unit 40 and then transmitted to the both eyeballs.

When the content output from the display unit 10 is enlarged through the magnifying lens unit 30, a distance from the magnifying lens unit 30 to the enlarged image may be adjusted as necessary. That is, an image enlarged by the magnifying lens unit 30 can be seen as a virtual image, not a real image, and a length of a transmission path thereof can be adjusted such that the virtual image can be seen to a user over the smart glasses.

A distance li from the magnifying lens unit 30 to the virtual image felt by a user or a driver is adjusted according to a relationship between a focal length f of the magnifying lens unit 30 and a distance lo from the display unit 10 to the magnification lens unit 30. The relationship between the above distances satisfies the following equation (1).

$$l_i = (f \times l_O)/(f - l_O)$$ [Equation 1]

According to the present embodiment, smart glasses can be designed and manufactured such that an enlarged image is formed at a position desired by a user. In the present embodiment, it is possible to realize a content of 20 inches in size about 2.4 meters in front of the smart glasses. When a content of about 20 inches in size is provided about 2 meters in front of the smart glasses, the user can conveniently implement an augmented reality or a virtual reality as necessary.

Figure 6:
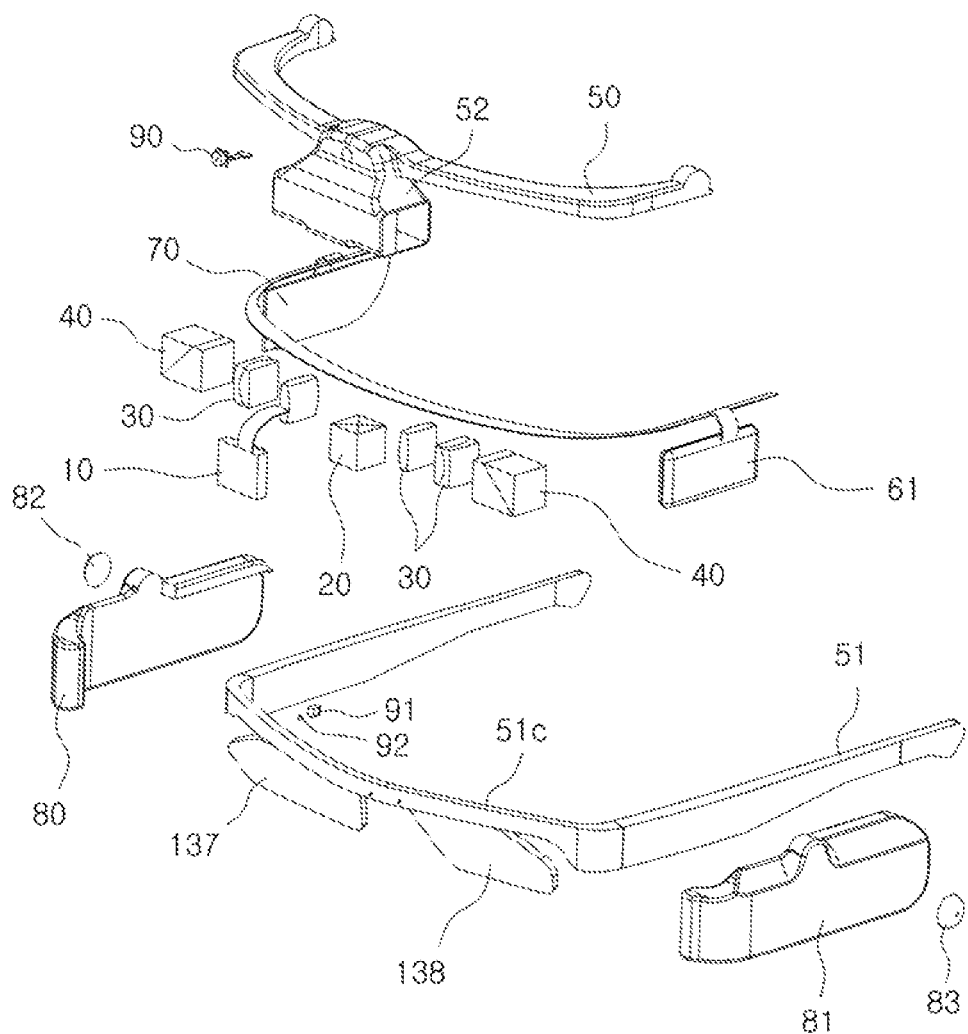
FIG. 6 is an exploded perspective view of smart glasses according to another embodiment of the present invention.

FIG. 6 is an exploded perspective view of smart glasses according to another embodiment of the present invention.

Referring to FIG. 6, smart glasses according to the present embodiment may provide a center frame 51c of the second frame 51 including spectacle lenses-combined main lenses 137 and 138 instead of spectacle lenses 137a and 138a. The main lenses 137 and 138 may function as a bidirectional reflection unit for reflecting an image of the display unit 10 to the front of the user while reflecting the image into the user's eyes. In this case, the above-mentioned reflection and transmissive unit 40 may be installed or replaced as a reflecting member which performs only a reflection function.

Since the smart glasses of the present embodiment are substantially the same as the smart glasses of the embodiment described above with reference to FIGS. 1 to 5 except that the main lenses 137 and 138 are used instead of the spectacle lenses 137a and 138a, detailed descriptions of the elements and combining relationships therebetween are omitted.

Figure 7:
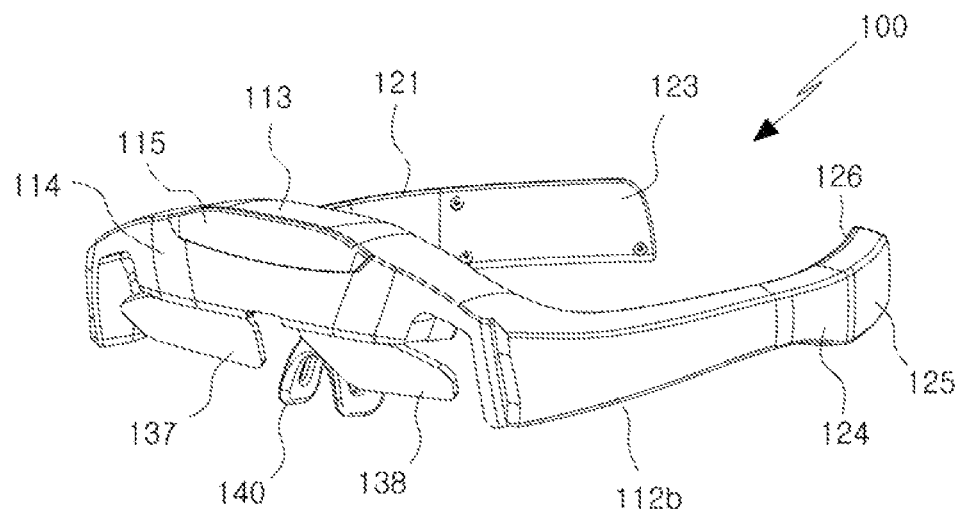
FIG. 7 is a perspective view of smart glasses according to still another embodiment of the present invention.
Figure 8:
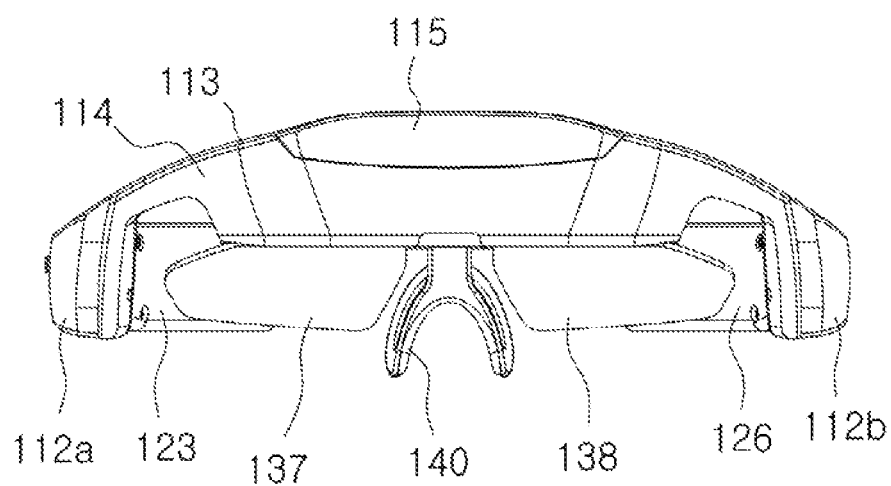
FIG. 8 is a front view of the smart glasses of FIG. 7.
Figure 9:
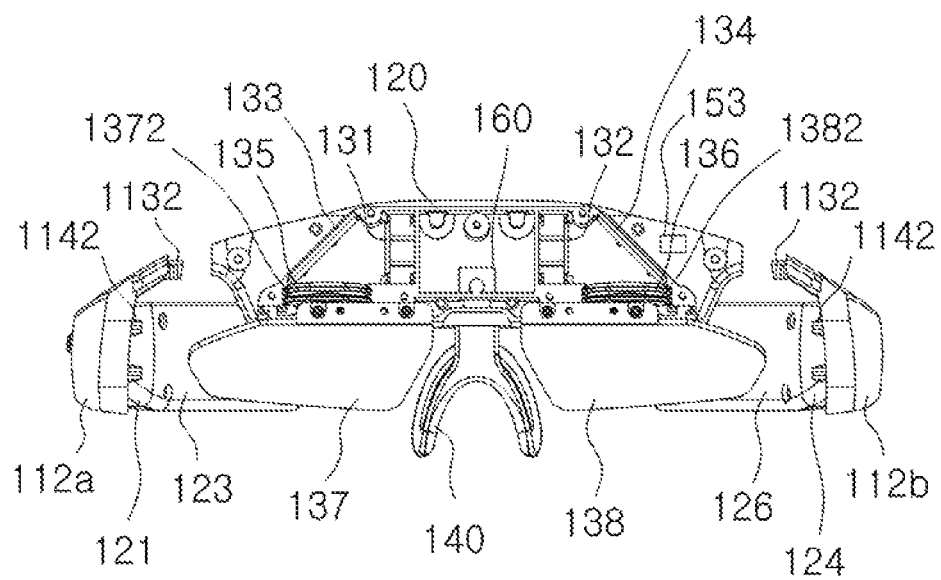
FIG. 9 is a partial projection front view for explaining an internal structure of the smart glasses of FIG. 8.
Figure 10:
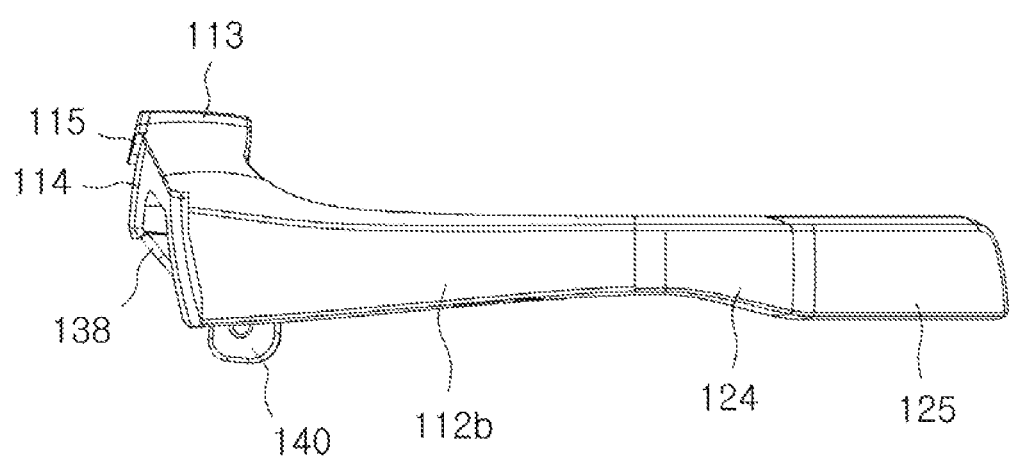
FIG. 10 is a right-side view of the smart glasses of FIG. 7.
Figure 11:
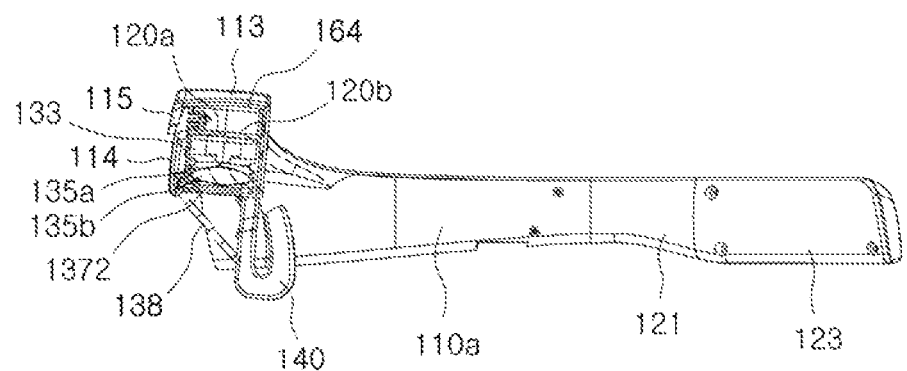
FIG. 11 is a partial projection right side view for explaining an internal structure of the smart glasses of FIG. 10.
Figure 12:
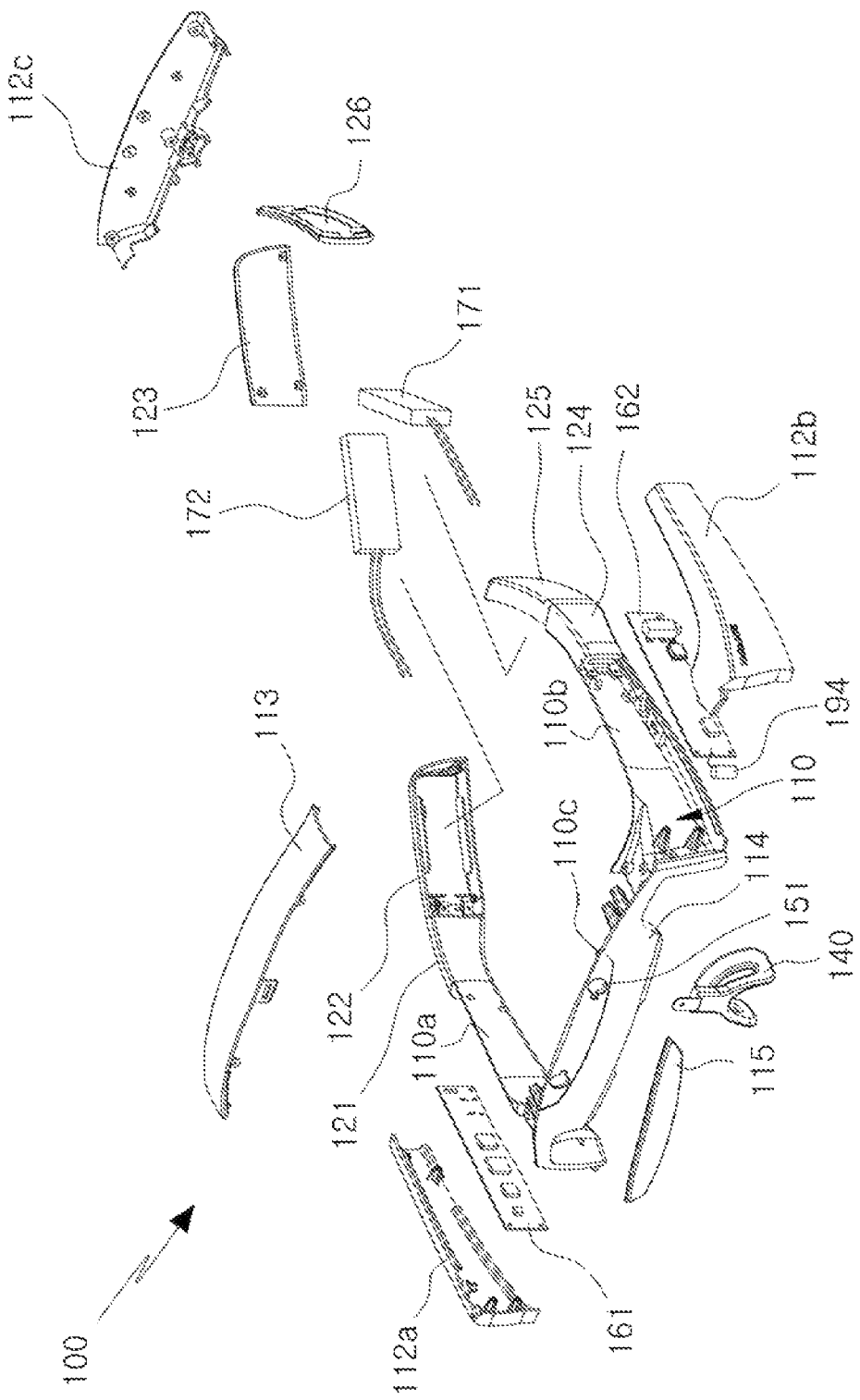
FIG. 12 is a partially exploded perspective view for explaining elements of the smart glasses of FIG. 7.

FIG. 7 is a perspective view of smart glasses according to still another embodiment of the present invention. FIG. 8 is a front view of the smart glasses of FIG. 7. FIG. 9 is a partial projection front view for explaining an internal structure of the smart glasses of FIG. 8. FIG. 10 is a right-side view of the smart glasses of FIG. 7. FIG. 11 is a partial projection right side view for explaining an internal structure of the smart glasses of FIG. 10. FIG. 12 is a partially exploded perspective view for explaining elements of the smart glasses of FIG. 7.

The smart glasses 100 according to the present embodiment include a main frame 110, a first display 131, a second display 132, a first mirror 133, a second mirror 134, a first main lens 137, and a second main lens 138. In addition, the smart glasses 100 may further include a first auxiliary lens 135 and a second auxiliary lens 136.

In addition, the smart glasses 100 may include a controller including a processor (see reference numeral 260 of FIG. 16), a display interface 160 for first and second displays 131 and 132, and a flexible printed circuit board (FPCB) 164 for connecting therebetween. The controller may be referred to as a control and power source device, and may include an embedded or separate communication and power board. The communication and power board may include a connector, or means or elements for relaying or interconnecting communications or power.

In addition, the smart glasses 100 may include one or more front cameras 151 and one or more rear cameras 153. When the front camera 151 includes a first front camera and a second front camera which are separated from each other by a predetermined distance, it is possible to easily input or apply 3D contents. The front camera or rear camera may be a sensor or function as a sensor. In particular, the rear camera 153 or the sensor may be a means for detecting a user's eyelid movements or a device for performing a function corresponding to the means.

In addition, the smart glasses 100 may further include an actuator or a driver 194 that vibrates according to a signal from a camera, a sensor, or a control and power source device, or may further include a speaker for outputting an acoustic signal in response to the signal. The driver 194 may include a vibration motor.

In addition, the smart glasses 100 may further include a heat sink or a heat dissipation structure for dissipating heat generated in the first display 131, the second display 132, the display interface 160, and the like. At least one of the first display 131 and the second display 132 may be referred to as a display unit.

In describing each element in more detail, the main frame 110 is formed of an approximately U-shaped rigid material and has eyeglasses shapes or eyeglasses frame shapes. The main frame 110 may be formed of a single structure. In this case, the main frame 110 may include a central frame portion 110c, and a left frame portion 110a and a right frame portion 110b which are connected to both sides of the central frame portion so as to form an eyeglasses frame. The left and right sides may be opposite sides from the user's perspective.

In the present embodiment, the main frame 110 may include a structure in which a support frame disposed at the center portion for easy manufacturing and lightweight, a first side frame coupled to the left side of the support frame, and a second side frame coupled to the right side of the support frame are combined. In this case, in order to facilitate the support, disposition, and assembly of a display, a mirror, an auxiliary lens, and a main lens, the support frame may be detachably attached to the first support frame 120a and the second support frame 120b.

Here, for convenience of explanation, the left frame portion and the first side frame are denoted by a single reference numeral 110a, and the right frame portion and the second side frame are denoted by a single reference numeral 110b. The support frame 120 in which the first support frame 120a and the second support frame 120b are combined may correspond to the front case 50 of FIG. 5 in terms of its function.

The display interface 160 is inserted into the central portion of the support frame 120 and may be electrically connected to a controller through a terminal of the FPCB 164 disposed at the central upper side. In addition, the display interface 160 is connected to the first display 131 and the second display 132.

The FPCB 164 may extend from the terminal of the central front surface portion to the first side frame 110a and the second side frame 110b along the upper surface of the main frame 110 or the support frame 120.

The first display 131 and the second display 132 are disposed on both sides of the box-shaped central portion of the support frame 120 so as to output a first image and a second image in opposite directions to each other. The first display 131 or the second display 132 may include at least one selected from among a Thin Film Transistor Liquid Crystal Display (TFT LCD), and Organic Light Emitting Diode (OLED), Liquid Crystal on Silicon (LCoS), and Digital Light Processing (DLP)-based displays.

A first mirror 133, which is supported by a left side inclined surface supporting structure portion of the support frame 120, may be installed on the front surface of the first display 131 and reflect a first image of the first display 131 into a first downward direction which is approximately orthogonal to the left direction. Similarly, a second mirror 134, which is supported by a right side inclined surface supporting structure portion of the support frame 120, may be installed on the front surface of the second display 132, and a second image of the second display 132 is displayed on the right side and reflect a second image of the second display 132 into a second downward direction which is approximately orthogonal to the first downward direction. The second downward direction may be a direction parallel to the first downward direction with an interval approximately corresponding to a distance between both eyes of the user.

The first image reflected by the first mirror 133 is enlarged by the first auxiliary lens 135. The first auxiliary lens 135 may be inserted into and supported by the support structure of a concavo-convex shape of the support frame 120. The first auxiliary lens 135 enlarges the first image and transmits the enlarged first image to the first main lens 137.

Similarly, the second image reflected by the second mirror 134 is enlarged by the second auxiliary lens 136. The second auxiliary lens 136 may be inserted into and supported by the support structure of a concavo-convex shape of the support frame 120. The second auxiliary lens 136 enlarges the second image and transmits the enlarged second image to the second main lens 138.

With reference to an image viewing from an input terminal, the first auxiliary lens 135 or the second auxiliary lens 136 may have a laminated structure or a superposition arrangement in which the first auxiliary lens 135 or the second auxiliary lens 136 has one surface convex (the other surface concave), both the surfaces convex, and one surface convex. The above-mentioned first and second auxiliary lenses 135 and 136 are used to enlarge the first and second images to a desired size and to eliminate spherical aberration, and various modifications are possible according to the implementation thereof.

The first main lens 137 is disposed below the first auxiliary lens 135. The first main lens 137 may have a structure in which a relatively thin plate-shaped lens member is inclined with respect to the central axis of the first auxiliary lens 135. The first main lens 137 may be coupled to the lower portion of the central frame portion 110c (hereinafter, simply referred to as the center frame) or support frame 120 at the lower portion of the first auxiliary lens 135. The first main lens 137 may functions as a beam splitter, and reflect a first image or the first image having passed through the first auxiliary lens 135, at an approximately right angle toward the user's eyes.

For example, a first image travelling in an approximately vertical direction from the first mirror 133 forms an image directed to the user's eyes and a virtual image directed to the front of the user's eyes around the reflective surface of the first main lens 137. The distance from the reflective surface to a position in which the virtual image is formed or to an image surface may be about 20 meters.

Similarly, a second main lens 138 is disposed at the lower portion of the second auxiliary lens 136. The second main lens 138 may has a structure in which a relatively thin plate-shaped lens member is inclined with respect to the central axis of the second auxiliary lens 135. The second main lens 138 may be coupled to the lower portion of the center frame 110c or the support frame 120 at the lower portion of the second auxiliary lens 136. The second main lens 138 may function as a beam splitter and reflect a second image having passed through the second auxiliary lens 136 at an approximately right angle into the user's eyes.

For example, the second image travelling in an approximately vertical direction from the second mirror 134 forms an image directed to the user's eyes and a virtual image directed to the front of the user's eyes around the reflective surface of the second main lens 138.

Convex surfaces of the above-mentioned auxiliary lenses 135 and 136 may be provided with three aspheric lenses in order to eliminate spherical aberration and enlarge an image or content.

In addition, a nose ring member 140 may be connected to the central lower side of the support frame 120. At least a portion of the nose ring member 140 may be made of a relatively flexible material. The flexible material may include a synthetic resin.

An upper cover 113 may be coupled to the central upper side of the main frame 110, a front surface upper cover 114 may be coupled to the upper side of the central front surface, and a front surface auxiliary cover 115 may be coupled to the center of the central front surface uppermost. The front surface upper cover 114 and the rear cover 112c may be coupled to the center frame 120c by means of a fastening means, such as screws or bolts, while the first and second support frames 120a and 120b are interposed therebetween.

The front surface auxiliary cover 115 may cover the exposed lens portion of the front camera 151, and in this case at least a part of the front surface auxiliary cover 115 may be formed of a transparent or semitransparent material. In addition, depending on the implementation, the front surface auxiliary cover 115 may have an opening or a through hole through which the lens of the front camera 151 is exposed.

One end of a first side frame 110a may be connected to the left side of the support frame 120 and the other end of the first side frame 110a may be connected to the first side connection frame 121. The first side connection frame 121 may be connected to a first side end frame 122. The first side end frame 122 has an internal space for receiving a first battery 172, and an opening of the internal space facing a second side end frame 125 which will be described later may be detachably covered by means of a first flexible cover 123. At least part of surfaces of the first side connection frame 121 and the first flexible cover 123 comes into contact with the user's ear and the rear side thereof, and the first side connection frame 121 and the first flexible cover 123 may be formed of a rubber or soft synthetic resin material in order to improve the comfort of wearing glasses.

Similarly, one end of the second side frame 110b may be connected to the right side of the support frame 120, and the other end thereof may be connected to the second side connection frame 124. The second side connection frame 124 may be connected to a second side end frame 125. The second side end frame 125 has an inner space for receiving a second battery 171, and the opening of an inner space facing the first side end frame 122 or the first flexible cover 123 described above can be detachably closed by the second flexible cover 126. At least part of surfaces of the second side connection frame 121 and the second flexible cover 123 comes into contact with the user's ear and the rear side thereof, and the second side connection frame 121 and the second flexible cover 123 may be formed of a rubber or soft synthetic resin material in order to improve the comfort of wearing glasses. The first battery 171 and the second battery 172 may be referred to as a power source device, and one of the batteries may be mounted therein or all of which may be omitted according to an implementation.

A first side cover 112a may be installed on the outer side of the first side frame 110a, so as to receive a first Printed Circuit Board (PCB) 161 therein. The first PCB 161 may be connected to the first battery 172 and connected to one end of the FPCB 164. Similarly, a second side cover 112b may be coupled to the outer side of the second side frame 110b, so as to receive a second printed circuit board (PCB) 162 therein. The second PCB 162 may be connected to the second battery 171 and connected to the other end of the FPCB 164.

Figure 17:
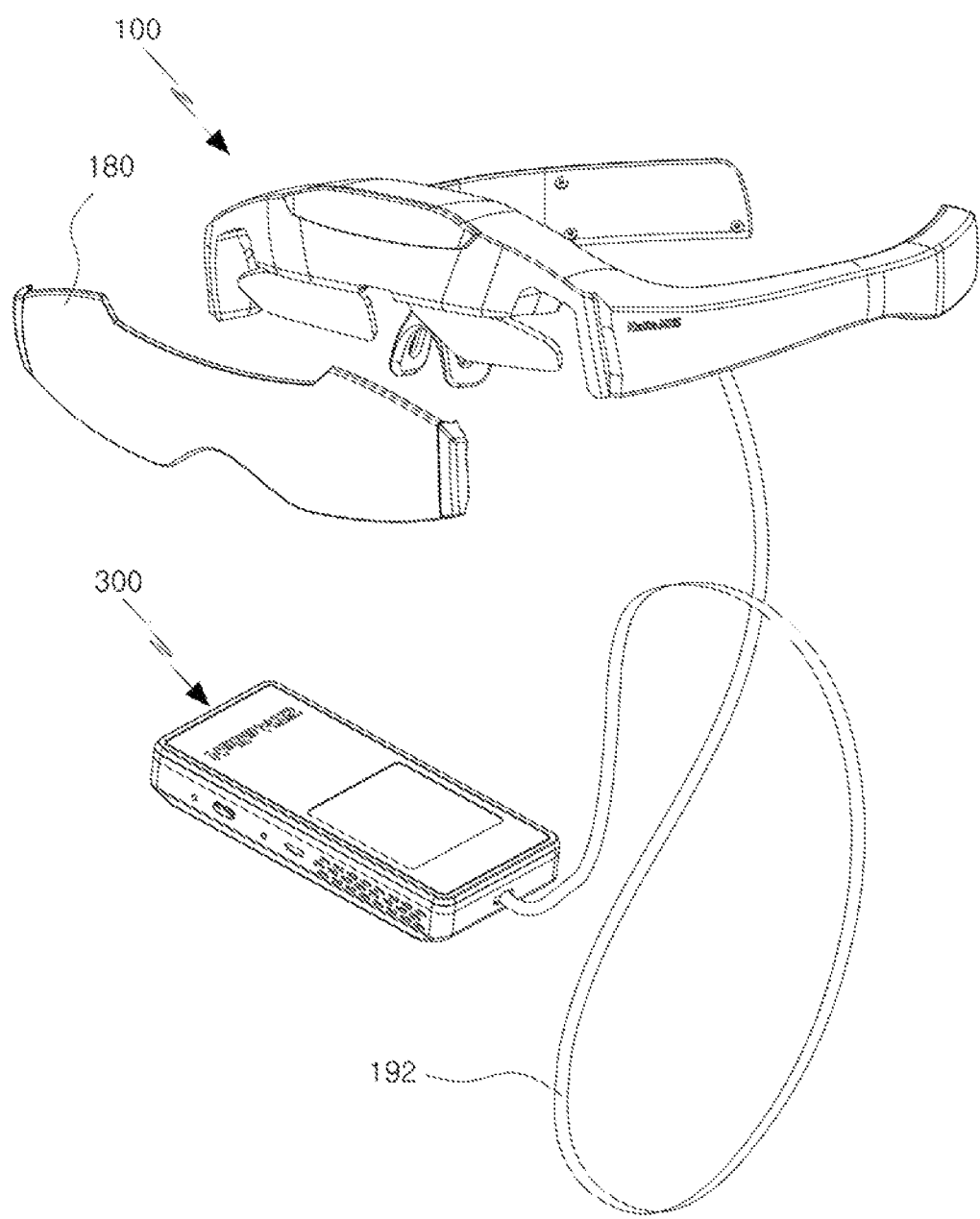
FIG. 17 is a perspective view of smart glasses and a control system according to another embodiment of the present invention.

The front side of the first side frame 110a and the second side frame 110b may be provided with protrusions or convex-concave portions in order to secure a coupling force and positioning in shield coupling (see reference numeral 180 in FIG. 17). Further, instead of the concave-convex portion, a magnet or a metallic material to which a magnet is adhered may be embedded in the vicinity of a surface on which the concave-convex is formed, and thus coupling with the shield can be facilitated and the stable coupling state can be maintained.

The first printed circuit board 161 may include at least one port or a first connector through which power is supplied or data transmission or reception to or from the outside is performed. The second printed circuit board 162 may include at least one port or a second connector through which power is supplied or data transmission or reception to or from the outside is performed. In addition, the first or second PCB 161 or 162 may have an earphone terminal.

The front camera 151 may include a lens that is exposed to the front surface of the main frame 110 or the center frame 120c. Two front cameras 151 may be installed, but it is not limited thereto. The lens of the front camera 151 or a peripheral portion thereof may be protected by the front surface auxiliary cover 115. The front camera 151 may be electrically connected to another end or an extension portion of the FPCB 164.

The rear camera 153 may include a lens that is exposed to the main frame 110 or the rear surface of the support frame 120. One rear camera 153 may be installed, but it is not limited thereto. The rear camera 153 may be electrically connected to another end or an extension portion of the FPCB 164.

A processor (see reference numeral 260 in FIG. 16) may be disposed on the first or second printed circuit board 161 or 162. The processor may control elements of the smart glasses 100 to operate and manage functions or operations of the smart glasses 100. The processor may include an Application Processor (AP).

The display interface 160 may control a timing of a signal transmitted to the first display 131 and the second display 132 under the control of the processor. The signal may include an image signal. In the present embodiment, the display interface 160 may include a dual and 3D Mobile Industry Processor Interface Digital Serial Interface (Dual & 3D MIPI DSI, hereinafter simply referred to as DSI) suitable for an application of 3D contents and the first and second displays 131 and 132, or a means or device for performing a function similar thereto.

In addition, a driver 194 may be embedded in the first side frame 110a or the second side frame 110b. The driver 194 is electrically connected to the first printed circuit board 161 or the second printed circuit board 162 and may operate according to signals from the front camera 151, the rear camera 153, the sensor, or the processor so as to generate vibration. For example, when a user's eyelids are recognized through the rear camera 153 and it is determined that the eyelids are covering the eyes for a predetermined time or more, it is possible to generate anti-drowsy alarm with vibration according to a signal from the rear camera 153.

In addition, a heat dissipation structure may be provided on the upper portion of the support frame 120 or a lower portion or a part of the upper cover 113. One end of the heat dissipation structure may be connected to the display interface 160, the first display 131, the second display 132, an LCD backlight or the like, so as to emit heat generated from at least one of the elements. For effective heat dissipation, the heat dissipation structure may extend along the longitudinal outline of the upper end portion of the center frame 120c, and may be provided with a plurality of fins on at least one surface to extend the cross-sectional area. Further, depending on the implementation, the heat dissipation structure may be connected to a material having a good conductivity, in which the material is installed by a constant width along the longitudinal direction of the upper cover 113, or may be integrally formed with a high conductivity material.

Figure 13:
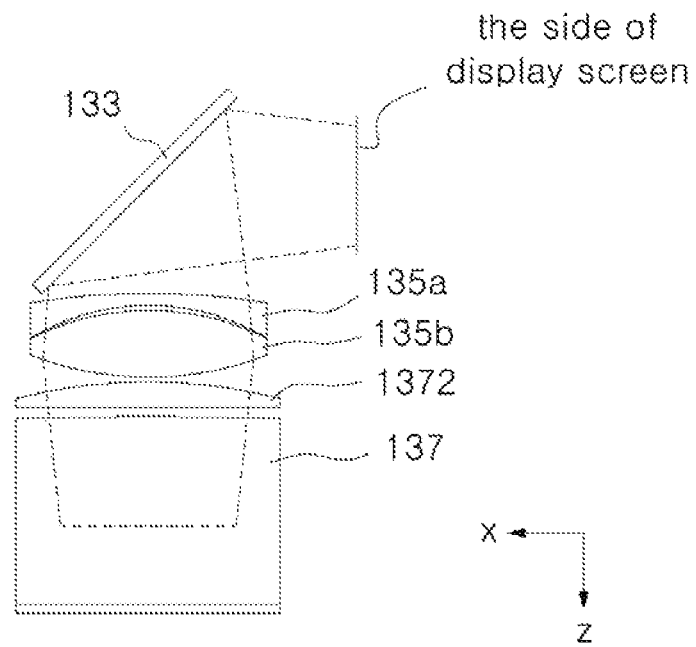
FIGS. 13 and 14 are views for explaining a display path of a display image of the smart glasses of FIG. 7.
Figure 14:
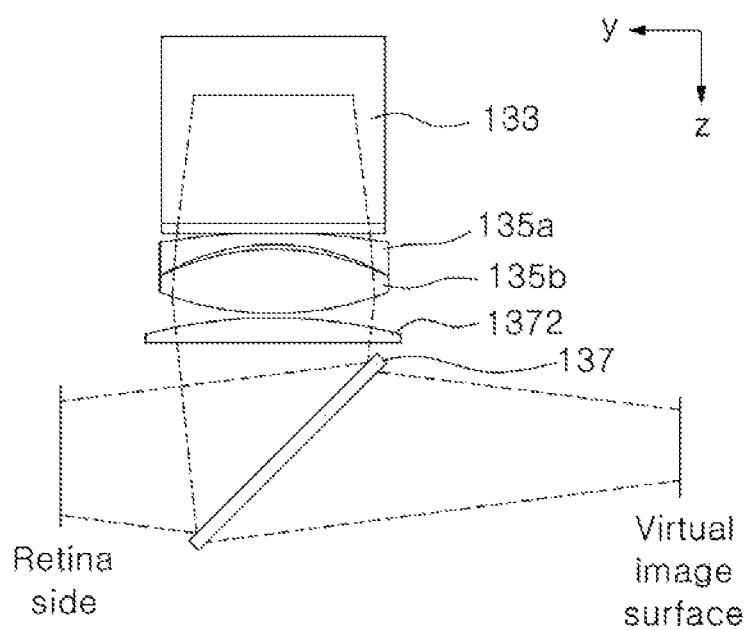

FIGS. 13 and 14 are views for explaining a display path of a display image of the smart glasses of FIG. 7.

In the present embodiment, an optical system including the first main lens 137 is mainly described, but it goes without saying that the present invention is equally applicable to an optical system including the second main lens 138.

Referring to FIGS. 13 and 14, the first main lens 137 according to the present embodiment is disposed at an inclined angle of about 30 to 60 degrees with respect to the first auxiliary lens. In addition, the first auxiliary lens includes a first one-surface convex lens 135a, a first bi-convex lens 135b, and a first convex surface lens 1372.

The first one-surface convex lens 135a has one surface convex and the other surface concave. The curvature of a concave surface of the first one-surface convex lens 135a may be set to be substantially equal to or the same as the curvature of convex surfaces facing each other of the first bi-convex lens 135b.

The first bi-convex lens 135b has convex surfaces on both one surface and the other surface thereof. The radius of curvature of the convex surface of one surface may be the same as the radius of curvature of the convex surface of the other surface, but is not limited thereto.

The first convex surface lens 1372 may have a convex surface opposite to the other convex surface of the first bi-convex lens 135b, and the opposite surface of the convex surface may have a plane shape.

According to the above-described configuration, the first image and the second image output from the first and second displays 131 and 132 of the smart glasses according to the present embodiment are reflected by the first mirror 133 and the second mirror 134, respectively, are enlarged by a combination of convex surfaces of the first auxiliary lens 135 and the second auxiliary lens 136, respectively, are split and reflected by the reflective surface of the first main lens 137 and the reflective surface of the second main lens 138, and then are projected onto the rear and front surfaces of the main lenses 137 and 138, respectively. The reflective surface may be referred to as a beam splitting surface.

Here, the first image and second image are enlarged through a combination of convex surfaces of the first auxiliary lens 135 and a combination of convex surfaces of the second auxiliary lens 136, and the convex surfaces of the first auxiliary lens 135 and the second auxiliary lens 136 are formed of an aspherical surface, whereby the spherical aberration can be eliminated.

In addition, the first and second images focused at predetermined positions on the front surfaces of the first and second main lenses 137 and 138 may form a predetermined single image plane or a virtual image plane. It is needless to say that a stereoscopic (3D) image, a virtual reality image, an augmented reality image, and the like may provide a multi-layer image plane or virtual image plane.

Further, in the smart glasses of the present embodiment, each of the main lenses 137 and 138 has an empty space between the side frames (see reference numeral 112b in FIG. 7). As described above, since no element is disposed outside the side surfaces of the respective main lenses 137 and 138, the present invention can provide a maximum optical viewing angle to a smart glasses wearer without limiting the viewing angle thereof.

Further, according to the present embodiment, a content implemented in the display can be enlarged using an auxiliary lens. In such a case, a distance from the auxiliary lens to the enlarged image can be adjusted as needed. That is, the size and resolution of the image enlarged by the auxiliary lens can be easily adjusted so that the image is seen to a user as a virtual image rather than a real image over the smart glasses.

A distance li from a main lens to a virtual image sensed by a user may be adjusted by a relationship between a focal length (f) of the main lens and a distance lo from the display to the reflective surface of the main lens. The relationship between the distances satisfies equation (1).

Therefore, it is possible to design and manufacture such that an enlarged image is formed at a position desired by a user. In the present embodiment, it is possible to configure a content having a size of about 20 inches at about 2.4 meters in front of the smart glasses. According to the present embodiment, it is possible to provide an approximately 20-inch content at about 2 meters in front of the smart glasses, and the user can easily implement an augmented reality or virtual reality as needed.

Figure 15:
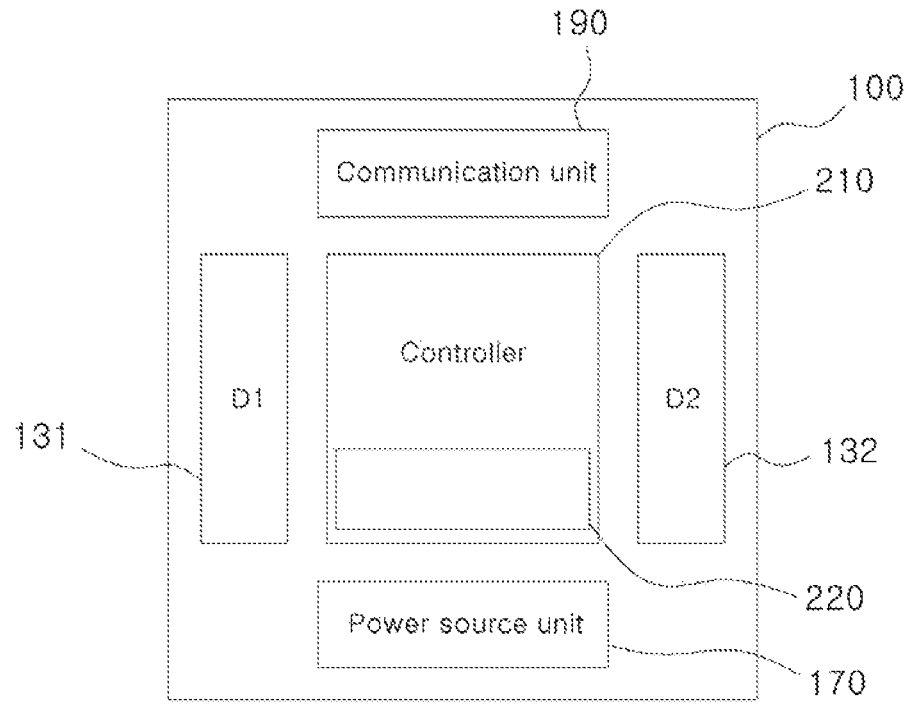
FIG. 15 is a block diagram of a control board that can be employed in the smart glasses of FIG. 7.

FIG. 15 is a block diagram of a control board that can be employed in the smart glasses of FIG. 7.

Referring to FIG. 15, smart glasses 100 according to the present embodiment may include a controller 210 connected to a first display D1 131 and a second display D2 132. In addition, the smart glasses 100 may include a power source unit 170 and a communication unit 190. The power source unit 170 may be referred to as a power source device or power supply unit, and may include a battery or a power supply terminal. In addition, the communication unit 190 may include a sub-system for wired or wireless communication. At least a part of the power source unit 170 and the communication unit 190 described above may be mounted on a printed circuit board. In this case, the printed circuit board may be referred to as a communication and power board.

The controller 210 may include a processor and a memory 220. The controller 210 may control the operation of the power source unit 170 and the communication unit 190 by a program stored in the memory 220, and may control the operation of the smart glasses 100. In the present embodiment, the controller 210 and the power source unit 190 are received and integrally formed in the smart glasses 100, but it is not limited thereto.

In the above-described embodiment, although it is described that the display interface is a separate element from the controller 210, the present invention is not limited to such a configuration and can be implemented such that the display interface is integrally formed in the controller.

Figure 16:
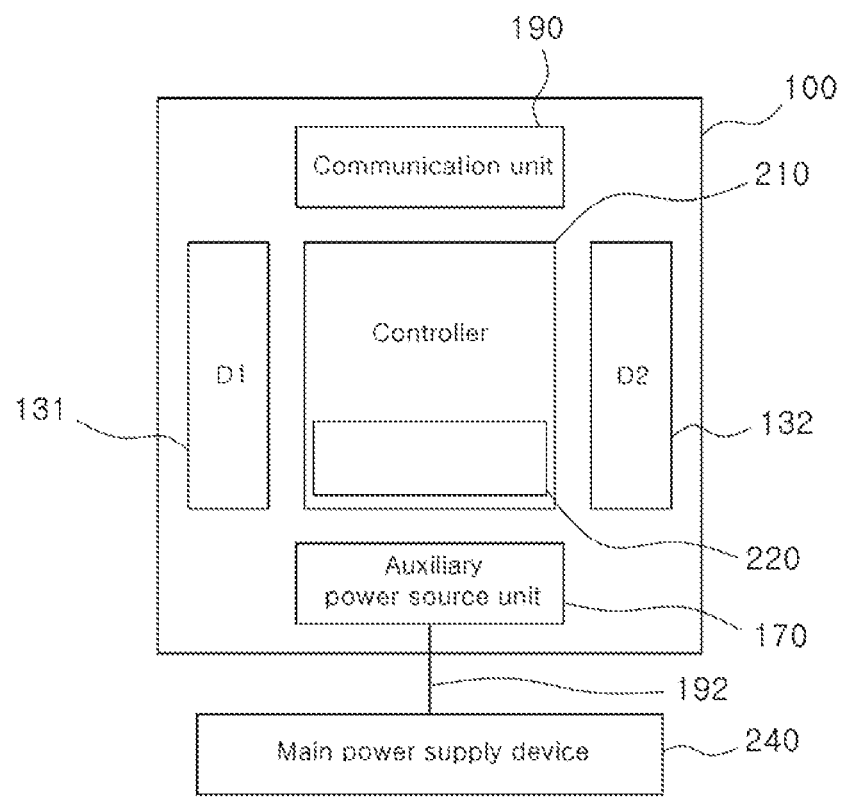
FIG. 16 is a block diagram for explaining another control board and a power supply device that can be employed in the smart glasses of FIG. 7.

FIG. 16 is a block diagram for explaining another control board and a power supply device that can be employed in the smart glasses of FIG. 7.

Referring to FIG. 16, the smart glasses 100 according to the present embodiment may be configured such that an auxiliary power source unit 170 including a small-scale battery or a single battery is installed as a power source unit, and a main power supply device 240 including a large-scale or large capacity battery is detachably connected to the outside of the smart glasses through a data and power line 192.

Here, the main power supply device 240 may be received in an external device (see reference numeral 300 of FIG. 17), and in this case, the external device 300 may monitor and manage power supply through a display window.

Figure 18:
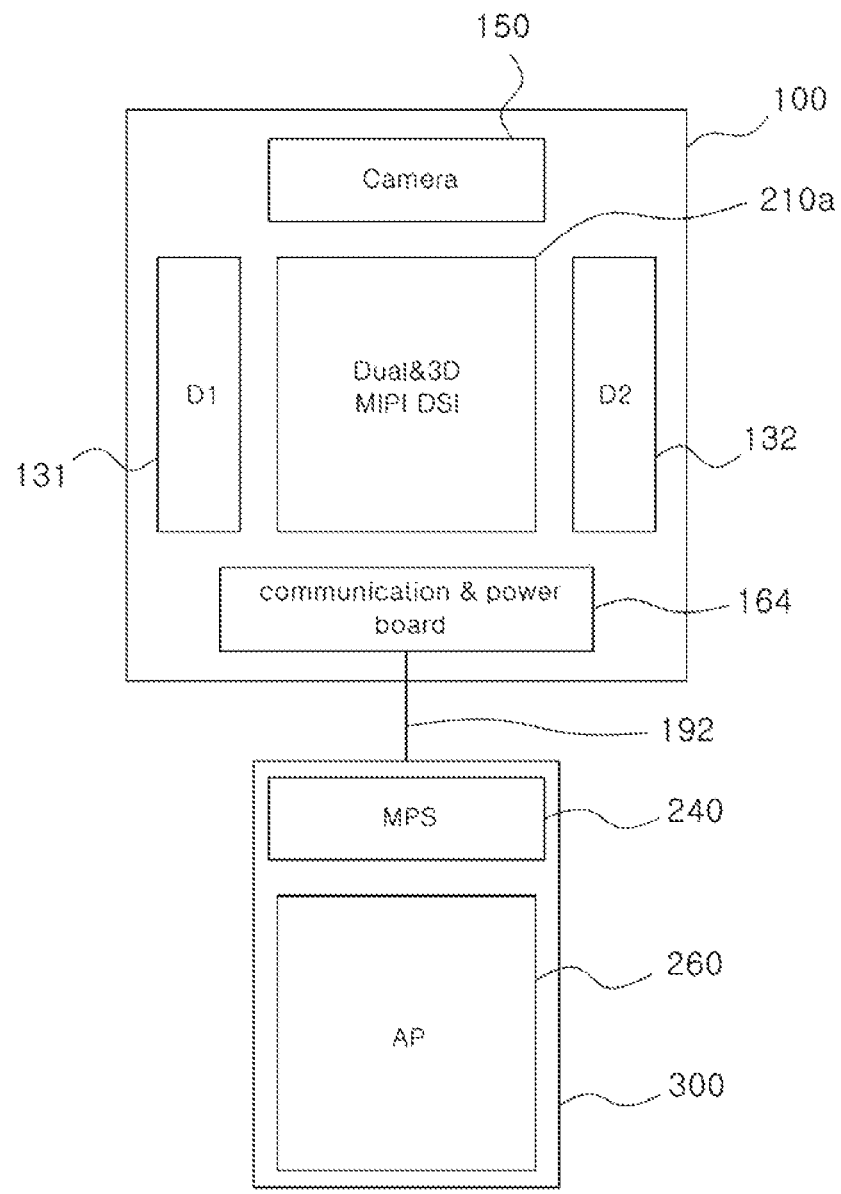
FIG. 18 is a block diagram for explaining the main configuration of the smart glasses of FIG. 17.

FIG. 17 is a perspective view of smart glasses and a control system according to another embodiment of the present invention. FIG. 18 is a block diagram for explaining a main configuration of the smart glasses shown in FIG. 17.

Referring to FIGS. 17 and 18, the smart glasses 100 according to the present embodiment may include a display interface, and may be implanted such that a control device connected to the display interface is disposed outside the smart glasses 100. In addition, the smart glasses 100 are implemented such that all of the batteries are substantially disposed outside the smart glasses 100.

Here, the display interface may be a dual and 3D Mobile Industry Processor Interface digital serial interface (Dual & 3D MIPI DSI) 201*a* (hereinafter, simply referred to as DSI), or may be a means or device for performing a function similar thereto. When the display interface is used, it is suitable for implementing 3D content and the first and second displays 131 and 132.

For the above described configuration, the smart glasses 100 include a first display 131, a second display 132, a display interface 160, a camera 150, and a communication and power board 164.

The camera 150 may include a front or rear camera, and the communication and power board 164 may be connected to an external main power supply (MPS) 240 and an application processor (AP) 260 while being installed at a position in which the first or second printed circuit board is installed. In this case, the external device 300 is a control and power source device, and may externally control and monitor the operation of the smart glasses 100.

In the present embodiment, a first battery 172, a second battery 171 may be omitted together with a controller, a first printed circuit board 161, and most of a second printed circuit board 162. That is, a communication and power board 164 having a relatively simple structure is installed at a position of the second printed circuit board 162 so as to relay a communication and power connection between the smart glasses 100 and the external device 300, and most of the remaining electronic components may be omitted.

According to the present embodiments, the weight of the smart glasses 100 can be significantly reduced, and the use of convenience can be increased. In addition, according to the use of an external battery, the battery capacity can be relatively increased by a certain amount, and if necessary, it is possible to receive commercial power through a power terminal or receive power through another auxiliary battery, so that power required for long-time use of the smart glasses can be smoothly supplied.

Figure 19:
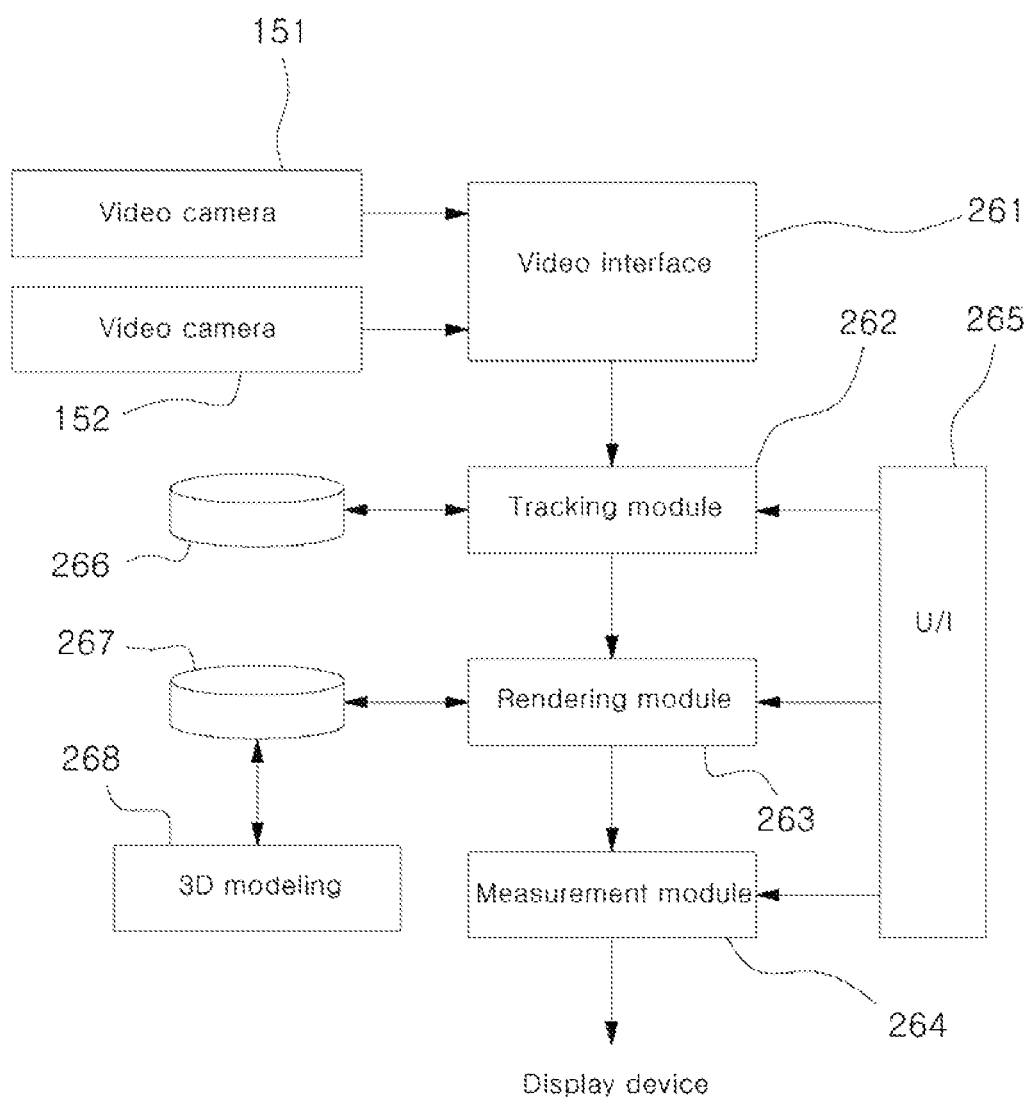
FIG. 19 is a block diagram for explaining the operation of a control device for smart glasses according to still another embodiment of the present invention.

FIG. 19 is a block diagram for explaining the operation of a control device for smart glasses according to still another embodiment of the present invention.

Referring to FIG. 19, a control device of the smart glasses according to the present embodiment may be referred to as an application processor and include a video interface 261, a tracking module 262, a rendering module 263, and a measurement module 264. The tracking module 262, the rendering module 263, and the measurement module 264 may be connected to a user interface (U/I) 265.

The video interface 261 may receive a video image stream input from the video camera 151 or 152 and transfer the image of a desired interval to the tracking module 262.

The tracking module 262 may receive image data from the video interface 261 and transfer a measurement image and a pose estimation result to the rendering module. At this time, the tracking module 262 may receive adjustment information including adjustment parameters and the like through the user interface 265, and may recognize a marker by using marker information stored in a marker information database 266. The marker functions as an intermediary between a real image and a virtual object. The marker information may include information on a size, a pattern, and the like of the marker. The marker information database 266 may be replaced with marker information stored in a predetermined storage unit.

The rendering module 263 is responsible for generation and elimination of a virtual object. The rendering module 263 may obtain adjustment information and the like through the user interface 265. The adjustment information may include load or unload, rotation, movement (such as coordinate movement), scaling and the like. The rendering module 263 may operate in conjunction with an engine for supporting a three-dimensional (3D) modeling (briefly, a 3D modeling engine 268) or a means for performing the above function, through a content resource database 267. The 3D modeling engine 268 may generate a virtual object of the measurement image based on a virtual reality modeling language (VRML). The rendering module 263 may receive a virtual object from the content resource database 267 and perform rendering of the measurement image.

The measurement module 264 may measure a distance between the virtual objects and a distance and a direction between generated coordinate systems, and check whether an interference exists between the virtual objects. The measurement module 264 may receive an augmented image from the rendering module 263 and provide the augmented reality image to the display device according to object information input through the user interface 265. The object information may include information of a positive or negative registration, a three-dimensional point, a collision, and the like.

Figure 20:
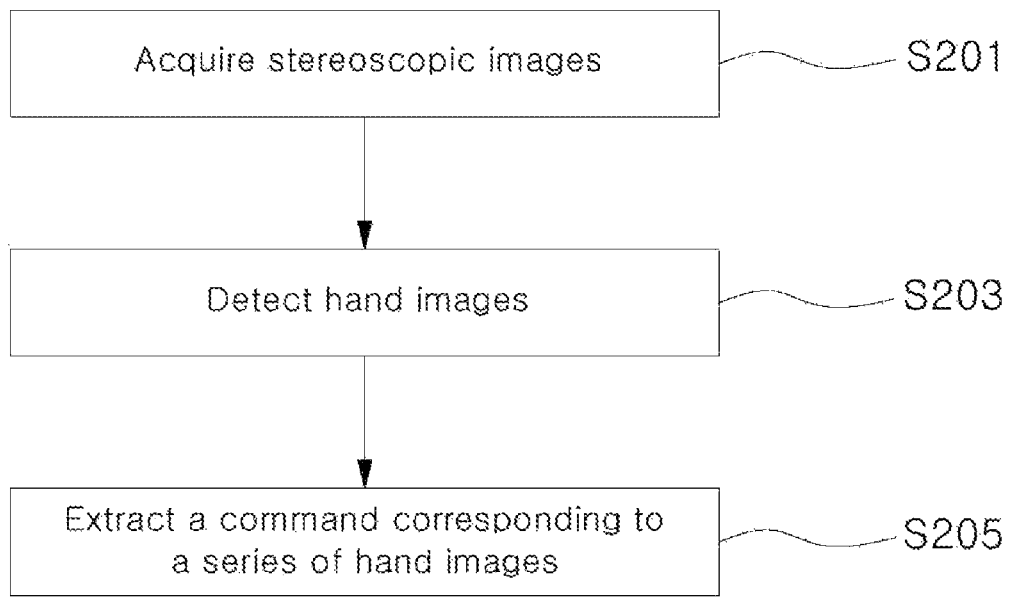
FIGS. 20 and 21 are flowcharts for explaining the operation of a control device of smart glasses according to still another embodiment of the present invention.
Figure 21:
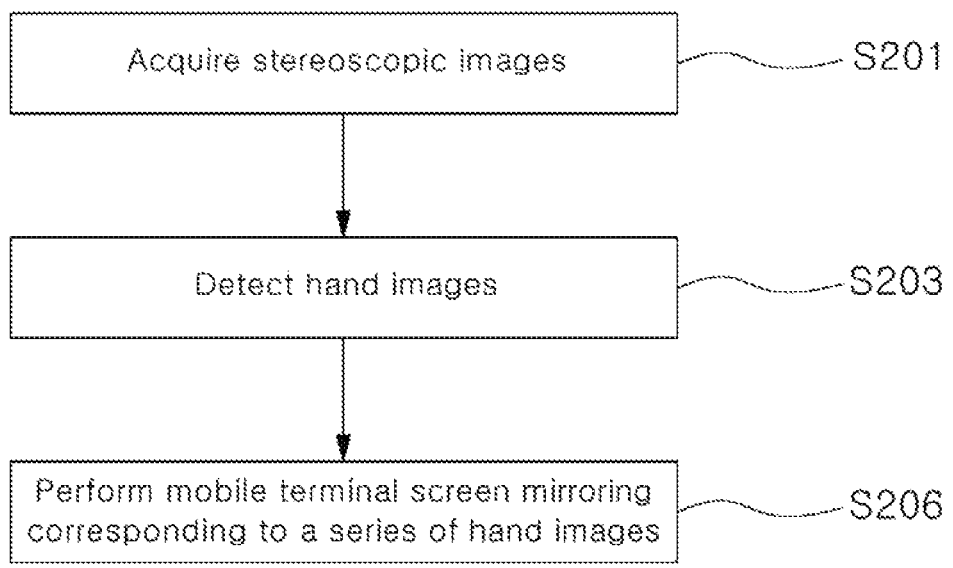

FIGS. 20 and 21 are flowcharts for explaining the operation of a control device of smart glasses according to still another embodiment of the present invention.

Referring to FIG. 20, the control device of the smart glasses according to the present embodiment may acquire a stereoscopic image through a camera (S201). The control device may generate a depth map image based on the stereoscopic image.

Next, the control device may detect or extract a hand image (S203). The control device may extract the hand image from the depth map image.

Next, the control device may extract a command corresponding to a series of hand images from the storage unit or a database (S205). The control device may recognize a command previously set corresponding to a vector component indicated by a series of hand images produced by the hand images extracted for a predetermined time, an image region corresponding to a start point and an end point of the vector component, or an object positioned in the image region. Here, the object may have different types of menus, icons, and the like corresponding to the preset command.

According to the present embodiment, the control device of the smart glasses may detect the hand motion through image processing and control the image displayed through the smart glasses based on the detection. For example, the image control may include execution of a preset command through the recognition of forward or backward moving of the image, fast-forwarding of the image, rewinding of the image, and a touch on a specific area of the image.

In addition, the control device may recognize the hand in an image frame input for recognition of the hand motion, detect an image where hands are located, recognize or predict the direction of the hand motion, and accordingly place a content on the screen or move the current image, or superimpose the current image on another image. The prediction of hand motion may include recognition of a hand, a finger, or a combination thereof. Such a gesture recognition may be performed based on image processing and preconfigured gesture information.

According to the present embodiment, a user interface that uses hand motion in virtual reality, mixed reality, and the like as well as augmented reality can be provided, and thus various contents of the smart glasses can be effectively used and the user convenience can be greatly improved.

For example, according to the present embodiment, it is possible to perform approval through an augmented reality while wearing smart glasses when shopping or performing tasks on a desk without a monitor, use a navigation function through an augmented reality, play an augmented reality game, watch a virtual reality video, make a video call with augmented reality or virtual reality, work on the field in augmented reality while worker wears smart glasses, or simply operate and use functions of smartphones on the screen of smart glasses.

In addition, referring to FIG. 21, a control device of the smart glasses according to the present embodiment may acquire a stereoscopic image through a camera (S201), and detect or extract a hand image based on the acquired stereoscopic image (S203), and then perform display mirroring of a mobile computing device, such as a mobile terminal or a notebook, on the basis of a series of hand images (S206).

The display mirroring may be referred to as screen mirroring, and refers to a function of viewing a screen of a mobile computing device through the screen of smart glasses wirelessly without connecting a separate line.

For screen mirroring, the display interface of a control device or control board of the smart glasses may receive and decode screen information when the mobile computing device encodes the screen information and transmits the screen information with frequency, and may output, through the display, the decoded image on the screen of the smart glasses. Wireless includes Bluetooth, but is not limited thereto, and other short range wireless communication schemes can be used.

When screen mirroring is used, the smart glasses may allow a mobile terminal having a communication function to perform services such as telephone reception, telephone conversation, video call, and the like, or perform text reception, text content check and the like, so as to easily use a service, such as telephone, text, and the like of the mobile terminal.

FIGS. 22 to 25 are views of modifications of an optical system that can be employed in the smart glasses of FIG. 7.

Figure 22:
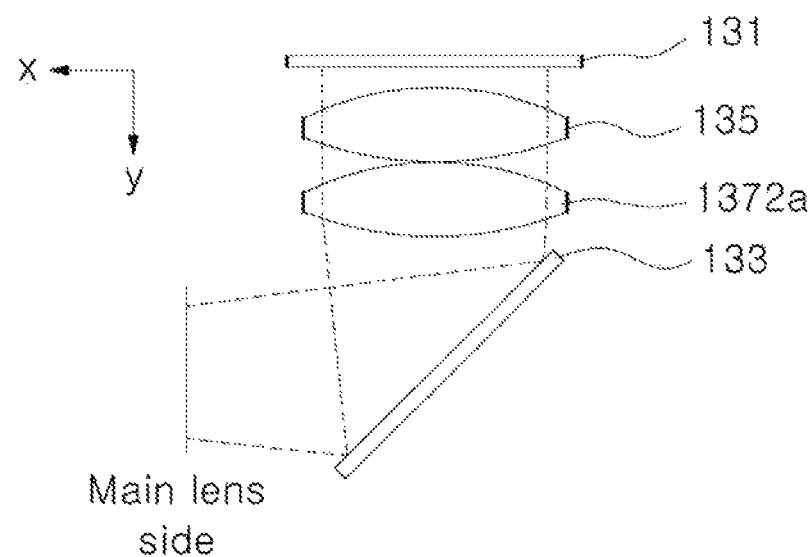
FIGS. 22 to 25 are views of modified examples of an optical system that can be employed in the smart glasses of FIG. 7.

Referring to FIG. 22, in the smart glasses according to the present embodiment, a first auxiliary lens 135, a second auxiliary lens 1372a, and a first mirror 133 may be arranged between a first display 131 and a main lens. The first auxiliary lens 135 and the second auxiliary lens 1372a may be arranged between the first display 131 and the first mirror 133 and sequentially arranged on the optical path.

The first auxiliary lens 135 and the second auxiliary lens 1372a may be convex lenses having the same shape and structure, but are not limited thereto. The reciprocal of a combined focal length between the first auxiliary lens 135 and the second auxiliary lens 1372a is equal to the sum of reciprocals of focal lengths of respective auxiliary lenses. The reciprocal of the combined distance is equal to the sum of a reciprocal of the distance from the first auxiliary lens 135 and the second auxiliary lens 1372a to the first display 131 and the reciprocal of the distance from the first auxiliary lens 135 and the second auxiliary lens 1372a to a virtual image passing through the first mirror 133.

Figure 23:
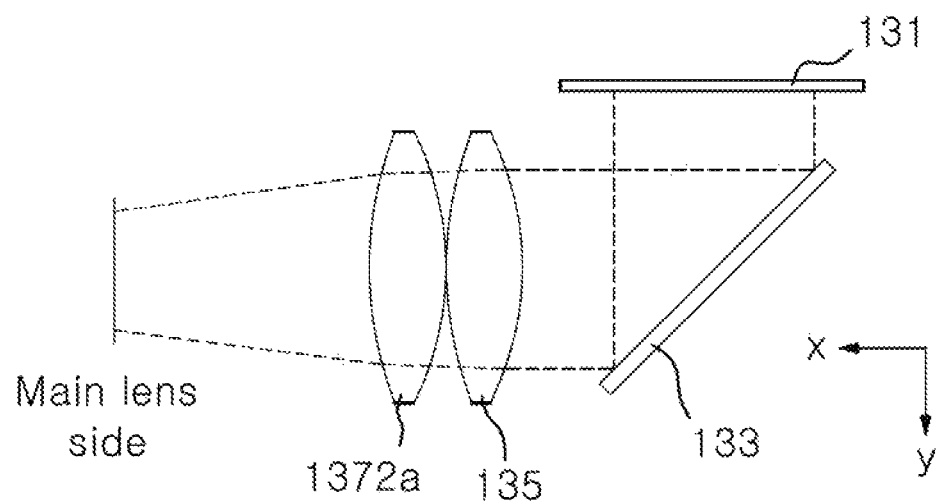

In addition, referring to FIG. 23, in the smart glasses according to the present embodiment, a first mirror 133, a first auxiliary lens 135, and a second auxiliary lens 1372a are sequentially arranged on the optical path between a first display 131 and a main lens in the order described as it is. The first auxiliary lens 135 and the second auxiliary lens 1372a may be disposed between the first mirror 133 and the main lens or between the first mirror 133 and a user's eyes.

Figure 24:
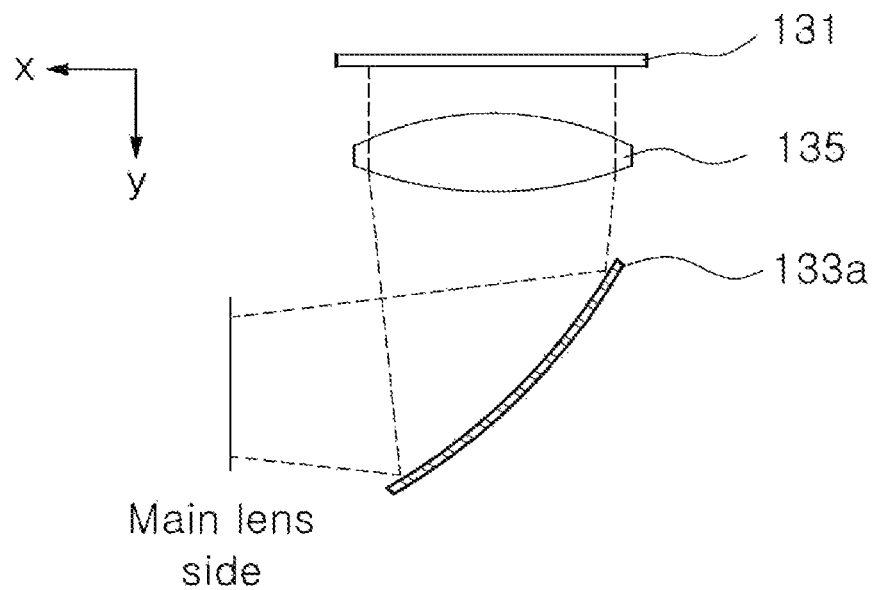

In addition, referring to FIG. 24, in the smart glasses according to the present embodiment, a first auxiliary lens 135 and a first concave mirror 133a are arranged on the optical path between a first display 131 and a main lens in the order described as it is. The first auxiliary lens 135 may be disposed between the first display 131 and the first concave mirror 133a.

The first concave mirror 133a has a shape and a function of combining one convex lens and a mirror to transmit an image to one of a user's two eyes. The concave surface of the first concave mirror 133a corresponds to a reflective surface by which light or an image is reflected.

Figure 25:
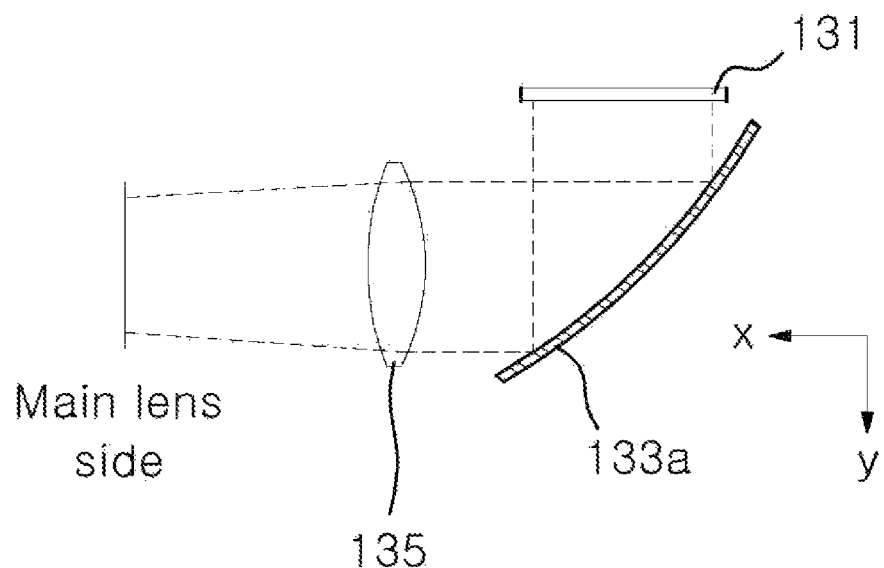

In addition, referring to FIG. 25, in the smart glasses according to the present embodiment, a first concave mirror 133a and a first auxiliary lens 135 are sequentially arranged on the optical path between a first display 131 and a main lens in the order described as it is. The first auxiliary lens 135 may be disposed between the first concave mirror 133a and the main lens.

Figure 26:
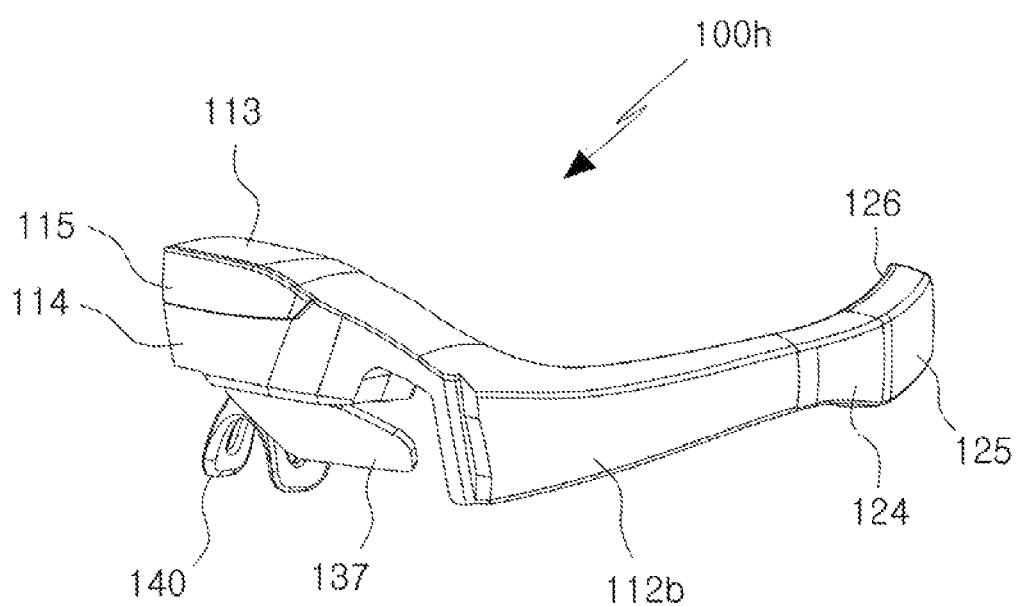
FIG. 26 is a perspective view of smart glasses according to still another embodiment of the present invention.

FIG. 26 is a perspective view illustrating smart glasses according to still another embodiment of the present invention.

Referring to FIG. 26, the smart glasses 100h according to the present embodiment are not limited to provide an independent image to both eyes of the user, and may include a form and structure for providing an image to only one eye of the user. In the present embodiment, the smart glasses 100h may be implemented as an apparatus for providing an image to the left eye of a user, but is not limited thereto, and may be implemented as an apparatus for providing an image to the right eye of the user.

The smart glasses 100h include a main frame having an eyeglass frame shape, a support frame coupled to the central portion of the main frame, a display supported by the support frame and displaying an image, a mirror for reflecting an image, and a main lens 137 for reflecting the image, which has been reflected by the mirror, toward the user's eyes.

That is, the smart glasses 100h include a main frame 100h having a shape of hooking around a user's one ear and a length extending from one ear to the front of the user's one eye adjacent to the one ear; a support frame coupled to the front surface portion of the main frame corresponding to the front of the one eye; a display supported by the support frame and outputting an image in a first direction; a mirror for reflecting the image in a second direction orthogonal to the first direction; a main lens for reflecting an image reflected by the mirror to the user's eyes; and a convex lens installed between the display and the main lens to adjust a focal distance of a virtual image of an image viewed through the main lens.

An upper cover 113 is coupled to a central upper side of the main frame and a front surface upper cover 114 is coupled to a central front surface, and a front surface auxiliary cover 115 may be coupled to the upper portion of the front surface upper cover 114. A nose ring member 140 may be coupled to a lower portion of the main frame.

The side frame may be coupled to the side of the main frame. The side cover 112b may be installed on the side frame while a printed circuit board is interposed therebetween.

A side connection frame 124 may be connected to an end part of the side frame, and a side end frame 125 may be coupled to one end part of the side connection frame. A battery is received in the inner space of the side end frame 125, and the opening thereof is detachably covered by the flexible cover 126.

According to the present embodiment, it is possible to provide smart glasses suitable for a user who has a problem in one eye or a user who is unwilling to use smart glasses with both eyes.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention. Therefore, the scope of the present invention should not be defined as being limited to the embodiments, but should be defined by the appended claims and equivalents thereof.

The invention claimed is:

1. Smart glasses comprising:
    a main frame having an eyeglass frame shape;
    a support frame coupled to a central portion of the main frame;
    a first display supported by the support frame and displaying a first image;
    a second display supported by the support frame and displaying a second image;
    a first mirror for reflecting the first image;
    a second mirror for reflecting the second image;
    a first main lens for providing a first main image from the central portion of the main frame to the inside thereof on the basis of the first image reflected by the first mirror;
    a second main lens for providing a second main image from the central portion of the main frame to the inside thereof on the basis of the second image reflected by the second mirror;
    a first auxiliary lens disposed between the first mirror and the first main lens; and
    a second auxiliary lens disposed between the second mirror and the second main lens, wherein the first auxiliary lens and the second auxiliary lens enlarge the first image and the second image, respectively,
    wherein the first or second auxiliary lens comprises an one-surface convex lens, a bi-convex lens, and a convex surface lens,
    wherein the one-surface convex lens has one surface convex and the other surface concave, the bi-convex lens has convex surfaces on both one surface and the other surface thereof, and the convex surface lens has a convex surface opposite to the other convex surface of the bi-convex lens, and the opposite surface of the convex surface has a plane shape.

2. The smart glasses of claim 1, wherein the first main lens and the second main lens are formed of plate-shaped reflective and transmissive members, and are arranged to be inclined at a predetermined angle with reference to the central axis of each of the first and second auxiliary lenses.

3. The smart glasses of claim 2, wherein the first main lens or the second main lens has a thickness of several millimeters or less.

4. The smart glasses of claim 1, further comprising a communication and power board received in a left or right frame portion of the main frame and connected to one or more of the first and second displays, wherein the communication and power board is connected to an external control and power source device by wires and transfers signal and data communication between the control and power source and the first and second displays.

5. The smart glasses of claim 4, wherein both an application processor and a battery included in the control and power source device are disposed outside the smart glasses.

6. The smart glasses of claim 5, wherein the first display and the second display each have a built-in display interface for control.

7. The smart glasses of claim 4, further comprising a front camera installed on an outer surface of the central portion of the main frame and capturing an image of the front side, and connected to the control and power source device through the communication and power board.

8. The smart glasses of claim 7, wherein the front camera comprises a first front camera and a second front camera separated from each other by a predetermined distance.

9. The smart glasses of claim 4, further comprising a rear camera or sensor installed on the inner surface of the central portion of the main frame and capturing an image of the rear side, and connected to the control and power source device through the communication and power board.

10. The smart glasses of claim 9, wherein the rear camera or sensor detects a user's eyelids.

11. The smart glasses of claim 4, wherein the control and power source device comprises a control device and a power source device, wherein at least one of the control device and the power source device is supported by the main frame or mounted on an external device and connected to the communication and power board through a data and power source line mounted on the external device.

* * * * *